US009702316B2

(12) United States Patent
Iwai et al.

(10) Patent No.: US 9,702,316 B2
(45) Date of Patent: Jul. 11, 2017

(54) SPARK-IGNITION DIRECT INJECTION ENGINE

(71) Applicant: Mazda Motor Corporation, Aki-gun, Hiroshima (JP)

(72) Inventors: Kouhei Iwai, Hiroshima (JP); Masahisa Yamakawa, Hiroshima (JP); Junichi Taga, Higashihiroshima (JP); Shigeru Nakagawa, Aki-gun (JP); Saori Mizuno, Hatsukaichi (JP); Keiji Araki, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 204 days.

(21) Appl. No.: 13/972,562

(22) Filed: Aug. 21, 2013

(65) Prior Publication Data

US 2014/0069382 A1 Mar. 13, 2014

(30) Foreign Application Priority Data

Sep. 7, 2012 (JP) ................................ 2012-197023

(51) Int. Cl.
*F02D 41/30* (2006.01)
*F02D 43/04* (2006.01)
(Continued)

(52) U.S. Cl.
CPC ......... *F02D 43/04* (2013.01); *F02D 41/1446* (2013.01); *F02D 41/18* (2013.01);
(Continued)

(58) Field of Classification Search
CPC ............... F02D 41/402; F02D 41/3035; F02D 41/0057; F02D 41/401; F02D 2041/001;
(Continued)

(56) References Cited

U.S. PATENT DOCUMENTS

2009/0272362 A1\* 11/2009 Yun et al. ...................... 123/295
2010/0242899 A1\* 9/2010 Hitomi et al. ................. 123/299
(Continued)

FOREIGN PATENT DOCUMENTS

| JP | 2001152919 A | 6/2001 |
| JP | 2002161780 A | 6/2002 |
| JP | 2007154859 A | 6/2007 |
| JP | 2009197740 A | 9/2009 |
| JP | 2010236429 A | 10/2010 |

*Primary Examiner* — Hai Huynh
*Assistant Examiner* — Gonzalo Laguarda
(74) *Attorney, Agent, or Firm* — Alleman Hall Creasman & Tuttle LLP

(57) ABSTRACT

A spark-ignition direct injection engine is provided. The engine includes an engine body, a fuel injection valve, a fuel pressure setting mechanism, an ignition plug, and a controller. The controller switches between a compression-ignition mode where the engine body is operated to perform compression-ignition combustion and a spark-ignition mode where the engine body is operated to perform spark-ignition combustion. Immediately after switching from the spark-ignition mode to the compression-ignition mode, the controller operates the engine body in a compression-ignition initial mode where the fuel pressure is set to be 30 MPa or above and the fuel injection valve is controlled to perform the fuel injection in a period from a late stage of the compression stroke to an early stage of the expansion stroke so that the gas mixture self-ignites to combust.

14 Claims, 8 Drawing Sheets

(51) Int. Cl.
*F02D 41/14* (2006.01)
*F02D 41/18* (2006.01)
*F02D 41/38* (2006.01)
*F02D 41/40* (2006.01)
*F02D 41/00* (2006.01)

(52) U.S. Cl.
CPC ..... *F02D 41/3035* (2013.01); *F02D 41/3064* (2013.01); *F02D 41/3836* (2013.01); *F02D 41/401* (2013.01); *F02D 41/3041* (2013.01); *F02D 2041/0067* (2013.01); *F02D 2200/0406* (2013.01); *Y02T 10/44* (2013.01); *Y02T 10/47* (2013.01)

(58) Field of Classification Search
CPC ............. F02D 41/3011; F02D 41/3064; F02D 41/3041; F02D 41/40; Y02T 10/128; Y02T 10/44; Y02T 10/47; Y02T 10/18; F02M 25/0728; F02M 25/0752; F02B 23/101
USPC .............................. 123/406.47, 295; 701/102
See application file for complete search history.

(56) References Cited

U.S. PATENT DOCUMENTS

| | | | |
|---|---|---|---|
| 2011/0180047 A1* | 7/2011 | Yamakawa et al. | 123/564 |
| 2012/0216774 A1* | 8/2012 | Oba et al. | 123/305 |
| 2012/0216775 A1* | 8/2012 | Iwai et al. | 123/305 |
| 2012/0216776 A1* | 8/2012 | Nagatsu et al. | 123/305 |
| 2013/0284146 A1* | 10/2013 | Tsujita et al. | 123/297 |
| 2014/0000568 A1* | 1/2014 | Nishida et al. | 123/490 |
| 2014/0001290 A1* | 1/2014 | Nishida et al. | 239/585.1 |
| 2014/0060489 A1* | 3/2014 | Iwai et al. | 123/478 |
| 2014/0060490 A1* | 3/2014 | Iwai et al. | 123/478 |
| 2014/0060493 A1* | 3/2014 | Iwai et al. | 123/478 |
| 2014/0069382 A1* | 3/2014 | Iwai et al. | 123/406.47 |
| 2014/0074378 A1* | 3/2014 | Iwai et al. | 701/104 |
| 2014/0251252 A1* | 9/2014 | Wasada et al. | 123/184.21 |
| 2014/0283784 A1* | 9/2014 | Takahashi et al. | 123/350 |
| 2014/0283785 A1* | 9/2014 | Takahashi et al. | 123/350 |
| 2015/0083072 A1* | 3/2015 | Nagatsu et al. | 123/27 R |
| 2015/0083073 A1* | 3/2015 | Nagatsu et al. | 123/294 |
| 2015/0114342 A1* | 4/2015 | Iwai et al. | 123/305 |

* cited by examiner

SPARK-IGNITION DIRECT INJECTION ENGINE

BACKGROUND

The present invention relates to a spark-ignition direct injection engine.

Arts for improving both an exhaust emission performance and a thermal efficiency have been known. For example, JP2007-154859A discloses such an art using a combustion mode of compression-igniting a gas mixture inside the cylinder. With engines where such compression-ignition combustion is performed, the compression-ignition combustion occurs with a significant increase in pressure as the engine load increases, causing increase of combustion noises. Thus, as disclosed in JP2007-154859A, even for the engines which perform compression-ignition combustion, within an operating range on a high engine load side, instead of the compression-ignition combustion, spark-ignition combustion by the operation of the ignition plug has generally been performed.

JP2009-197740A discloses an art of an engine which performs compression-ignition combustion within a low engine load operating range with low engine speed similarly to the engine disclosed in JP2007-154859A, in which open periods of intake and exhaust valves are adjusted to leave burned gas at a high temperature inside a cylinder within the compression-ignition combustion performing range so that the in-cylinder temperature is increased to stimulate the compression-ignition combustion, whereas the open timing of an intake valve is advanced within a part of the compression-ignition combustion performing range where the engine load is relatively high and the engine speed is relatively high so that burned gas inside the cylinder is blown back to the intake port side once and then the burned gas is introduced into the cylinder again along with fresh air. In this manner, the temperature of the burned gas decreases because of the fresh air. Thus, within the relatively high-engine-speed high-engine-load range where the temperature and pressure become higher at compression top dead center, sudden extreme pressure increases due to the compression-ignition combustion can be suppressed.

On the other hand, in spark-ignition combustion, since a thermal efficiency is relatively low, the burned gas temperature increases. In contrast, in compression-ignition combustion, as described in JP2007-154859A and JP2009-197740A, the high-temperature burned gas is introduced into the cylinder to secure the ignitability. Therefore, with engines where the combustion mode is switched as described in JP2007-154859A and JP2009-197740A, a temperature atmosphere inside the cylinder is comparatively high and the high-temperature burned gas produced by the spark-ignition combustion is introduced into the cylinder immediately after the spark-ignition combustion is switched to the compression-ignition combustion, resulting in excessive increases in the in-cylinder temperature. This excessive increase may cause such pre-ignition that the gas mixture within the cylinder is compressed to ignite in, for example, a compression-stroke period, and a pressure increase rate (dP/dt) inside the cylinder, in other words, a rate of a pressure change inside the cylinder (dp) per a predetermined period of time (dt) in a pressure increasing period, may become significantly high to cause loud combustion noises.

Note that, the switching from the spark-ignition combustion to the compression-ignition combustion is not limited to be performed according to the engine load decrease, but may also be performed while the engine load is stable, as well as when an engine temperature increases from a cold-start state to a warmed-up state.

SUMMARY

The present invention is made in view of the above situations and avoids an increase of combustion noises when switching from spark-ignition combustion to compression-ignition combustion.

In the present invention, a characteristic fuel injection mode is performed at least temporarily when spark-ignition combustion is switched to compression-ignition combustion, which increases a fuel injection pressure and retards an injection timing of the fuel into the cylinder to near a compression top dead center. This characteristic fuel injection mode can stabilize the compression-ignition combustion in an expansion stroke period while avoiding pre-ignition of the gas mixture and generation of combustion noises.

Specifically, according to one aspect of the present invention, a spark-ignition direct injection engine is provided. The engine includes an engine body having a cylinder, a fuel injection valve for injecting fuel into the cylinder to form a gas mixture therein, a fuel pressure setting mechanism for setting a pressure of the fuel to be injected by the fuel injection valve, an ignition plug arranged to be oriented toward inside the cylinder and for igniting the gas mixture within the cylinder, and a controller for operating the engine body by controlling at least the fuel injection valve, the fuel pressure setting mechanism, and the ignition plug.

The controller switches a combustion mode between a compression-ignition mode in which the engine body is operated to perform compression-ignition combustion where the gas mixture within the cylinder self-ignites to combust, and a spark-ignition mode in which the engine body is operated to perform spark-ignition combustion where the ignition plug is controlled to ignite the gas mixture within the cylinder to combust. Immediately after switching from the spark-ignition mode to the compression-ignition mode, the controller operates the engine body in a compression-ignition initial mode in which the fuel pressure is set to be a high fuel pressure of 30 MPa or above by using the fuel pressure setting mechanism and the fuel injection valve is controlled to perform the fuel injection at least in a period from a late stage of compression stroke to an early stage of expansion stroke so that the gas mixture within the cylinder self-ignites to combust.

Here, "the late stage of the compression stroke" may be a late stage of the compression stroke when the compression stroke is divided into three periods of an early stage, a middle stage, and a late stage; and similarly, "the early stage of the expansion stroke" may be an early stage of the expansion stroke when the expansion stroke is divided into three periods of an early stage, a middle stage, and a late stage.

Immediately after switching from the spark-ignition mode to the compression-ignition mode, since the state inside the cylinder becomes a high temperature atmosphere due to a high burned gas temperature caused by the spark-ignition combustion, in the compression-ignition mode, even when attempting to inject the fuel on intake stroke and compress it to ignite near a compression top dead center (CTDC), pre-ignition combustion can occur during the compression stroke period and a sharp pressure increase may occur.

In contrast, according to the above configuration, immediately after switching from the spark-ignition mode to the compression-ignition mode, the compression-ignition initial mode is performed in which the fuel pressure is set to be the high fuel pressure of 30 MPa or above and fuel is injected into the cylinder in the period from the late stage of the compression stroke to the early stage of the expansion stroke.

As described above, since the fuel is injected into the cylinder at least in a late period from the late stage of the compression stroke to the early stage of the expansion stroke, the pre-ignition in the compression stroke period can surely be avoided. This avoids an increase in combustion noises immediately after the spark-ignition combustion mode is switched to the compression-ignition mode.

Further, comparatively increasing the fuel pressure increases the fuel injection amount injected per unit time. For the same fuel injection amounts, the high fuel pressure shortens the period of injecting the fuel into the cylinder (i.e., injection period). This becomes advantageous in comparatively shortening a period of time from the start of the fuel injection to the compression ignition.

Furthermore, the high fuel pressure is advantageous in atomizing the fuel spray injected into the cylinder and, due to injecting the fuel into the cylinder at the high fuel pressure, the turbulence of flow inside the cylinder near the CTDC becomes stronger and a turbulence energy inside the cylinder increases. By these factors, the fuel inside the cylinder near the CTDC is more finely mixed, and comparatively lean combustible gas mixture can be formed within a short period of time.

Thus, the comparatively lean combustible gas mixture formed by the fuel being injected at high fuel pressure is surely compressed to ignite after the CTDC, and it stably combusts in the expansion stroke period. In other words, after the fuel injection starts, since the comparatively lean combustible gas mixture is rapidly formed, at a suitable timing after the CTDC, the combustible gas mixture can be surely compressed to ignite. Further, since the in-cylinder pressure gradually decreases as the engine crankshaft turns on the expansion stroke, the in-cylinder pressure can be avoided from sharply increasing by the combustion, and the combustion becomes comparatively slow and stable. Note that, the fuel injection may be split, and in the case of splitting the injection, at least one out of the plurality of the split fuel injections is performed in the comparatively late period from the late stage of the compression stroke to the early stage of the expansion stroke.

The engine may also include an exhaust recirculator for introducing exhaust gas into the cylinder. The controller may cause the exhaust recirculator to introduce the exhaust gas into the cylinder in the compression-ignition mode.

While introducing the exhaust gas into the cylinder increases the in-cylinder temperature and is advantageous in stimulating the compression ignition during the compression-ignition initial mode, setting the fuel injection timing to be in the period at least from the late stage of the compression stroke to the early stage of the expansion stroke as described above avoids the pre-ignition even if the in-cylinder temperature is high, and thus, the increase of the combustion sound can be avoided.

The controller may advance the fuel injection timing after the compression-ignition initial mode ends.

The compression-ignition combustion is combustion with a high thermal efficiency, and the burned gas temperature is comparatively low. Therefore, by performing the compression-ignition combustion in the compression-ignition initial mode, the in-cylinder temperature becomes lower than immediately after the switching from the spark-ignition mode to the compression-ignition mode. If the in-cylinder temperature decreases, there will be no need to avoid the pre-ignition by setting the combustion ignition timing to the period at least from the late stage of the compression stroke to the early stage of the expansion stroke. Therefore, after the compression-ignition initial mode ends, in order to shift to the normal compression-ignition mode, it is preferred to advance the fuel injection timing. In this manner, a long gas mixture forming period can be secured, and thus, this becomes advantageous in forming lean gas mixture, which leads to improving the ignitability and combustion stability in the compression-ignition mode.

The controller may operate the engine body in the compression-ignition mode when an operating state of the engine body is within a predetermined low engine load range, and the controller may operate the engine body in the spark-ignition mode when the operating state of the engine body is within a higher engine load range than the predetermined low engine load range. The controller may operate the engine body in the compression-ignition initial mode immediately after the engine load decreases and the operating state of the engine body is shifted from the higher engine load range to the low engine load range.

In the spark-ignition mode where the operating state of the engine body is within the higher engine load range, the burned gas temperature is even higher because the fuel injection amount is relatively larger. Therefore, immediately after switching from the spark-ignition mode to the compression-ignition mode due to the shifting of the engine load decreasing from the higher engine load range to the low engine load range, the pre-ignition caused in the high temperature atmosphere inside the cylinder is more likely to occur. Therefore, by performing the compression-ignition initial mode immediately after shifting from the higher engine load range to the low engine load range, as described above, it becomes advantageous in avoiding the pre-ignition and surely avoiding the increase of the combustion noises. In other words, in the compression-ignition initial mode, the switching from the spark-ignition mode to the compression-ignition mode due to the shifting from the higher engine load range to the low engine load range, is especially advantageous.

Within a specific low engine load part of the low engine load range where the engine body is operated in the compression-ignition mode, the controller may control the fuel injection valve to perform the fuel injection at least in a period from the intake stroke to the middle stage of the compression stroke. The controller may operate the engine body in the compression-ignition initial mode immediately after the engine load decreases and the operating state of the engine body is shifted from the higher engine load range to the low engine load range, and the controller may advance the fuel injection timing to at least in the period from the intake stroke to the middle stage of the compression stroke immediately after the compression-ignition initial mode ends.

Within the low engine load range where the engine body is operated in the compression-ignition mode, in the specific part where the engine load is low, the fuel injection is performed in the period at least from the intake stroke to the middle stage of the compression stroke. In the specific part, since the engine load is low, the temperature and the pressure at the CTDC are relatively low, and this is disadvantageous in the compression ignitability. However, by injecting the fuel into the cylinder at a comparatively early timing from at least the intake stroke to the middle stage of the compression stroke, a lean gas mixture is formed by the strong in-cylinder turbulence and the long gas mixture forming period that is achieved, and the compression ignitability can be preferable.

Here, when the engine load decreases, and immediately after shifting from the higher engine load which is the spark-ignition mode, to the specific part of the low engine load range where the fuel injection is performed in the period at least from the intake stroke to the middle stage of the compression stroke, the problem of pre-ignition described above becomes more obvious. Thus, immediately after the operating state of the engine body is shifted from the higher engine load range to the specific part of the low engine load range, by performing the compression-ignition initial mode, the pre-ignition can be avoided and the increase in the combustion noises can be avoided.

By performing the compression-ignition initial mode to perform the compression-ignition combustion while avoiding the increase of the combustion noises, the in-cylinder temperature decreases. After the decrease of the in-cylinder temperature, the fuel ignition timing is advanced to the period from at least the intake stroke to the middle stage of the compression stroke so as to shift to the normal compression-ignition mode, and thus, as described above, the compression ignitability becomes preferable and the compression-ignition combustion can be stably performed.

The controller may control the fuel pressure setting mechanism to set the fuel pressure to a low fuel pressure of below 30 MPa when the fuel injection timing is advanced to at least in the period from the intake stroke to the middle stage of the compression stroke immediately after the compression-ignition initial mode ends.

The controller may operate the engine body in the compression-ignition mode when a temperature of the engine body is in a warmed-up state that is higher than a predetermined temperature, and the controller may operate the engine body in the spark-ignition mode when the temperature of the engine body is in a cold-start state that is lower than the predetermined temperature. The controller may operate the engine body in the compression-ignition initial mode immediately after the temperature of the engine body increases and the mode is switched from the spark-ignition mode to the compression-ignition mode.

In the cold-start state where the temperature of the engine body is below the predetermined temperature, since the compression ignitability degrades, the compression-ignition mode cannot be performed, and as a result, the spark-ignition mode is performed. Therefore, the switching from the spark-ignition mode to the compression-ignition mode can be performed not only when the engine load is changed, but also when the temperature of the of the engine body changes. That is, when the cold start state where the spark-ignition is performed is shifted to the warm-up state where the temperature of the engine body rises and the compression-ignition initial mode is performed, as described above, by performing the compression-ignition initial mode, the increase of the combustion noises can be avoided.

When the temperature of the engine body is in the cold-start state that is lower than the predetermined temperature, the controller may control the fuel pressure setting mechanism to set the fuel pressure to a low fuel pressure of below 30 MPa, control the fuel injection valve to perform the fuel injection at least in the period from the intake stoke to the middle stage of the compression stroke, and operate the engine body in the spark-ignition mode.

According to another aspect of the present invention, a spark-ignition direct injection engine is provided. The engine includes an engine body having a cylinder, a fuel injection valve for injecting fuel into the cylinder to form gas mixture therein, a fuel pressure setting mechanism for setting a pressure of the fuel to be injected by the fuel injection valve, an ignition plug arranged to be oriented toward inside the cylinder and for igniting gas mixture within the cylinder, and a controller for operating the engine body by controlling at least the fuel injection valve, the fuel pressure setting mechanism, and the ignition plug.

The controller operates, within a predetermined first operating range, the engine body in the compression-ignition mode to perform the compression-ignition combustion where the gas mixture within the cylinder self-ignites to combust, and the controller operates, within a second operating range that is other than the first range, the engine body in a spark-ignition mode to perform spark-ignition combustion where the ignition plug is controlled to ignite the gas mixture within the cylinder to combust. Within a specific part of the first operating range where the engine load is high therewithin, the controller controls the fuel pressure setting mechanism to set the fuel pressure to be a high fuel pressure of 30 MPa or above and controls the fuel injection valve to perform the fuel injection at least in a retard period from a late stage of compression stroke to an early stage of expansion stroke so that the gas mixture within the cylinder self-ignites to combust. Immediately after the operating state of the engine body is shifted from the second operating range to the specific part of the first operating range, the controller operates the engine body in a compression-ignition initial mode in which the fuel injection timing is retarded later than the injection timing set within the specific part, and after the compression-ignition initial mode ends, the fuel injection timing is advanced to the injection timing set within the specific part.

Within the specific high engine load part of the first operating range where the engine body is operated in the compression-ignition mode, compared to the engine load range lower than the specific part, the temperature and the pressure at the CTDC may become high; therefore, when injecting the fuel, for example, at the early timing in the intake stroke period, the pre-ignition may be caused.

According to the above configuration, within the specific high engine load part of the first operating range, the fuel pressure is set to the high fuel pressure of 30 MPa or above, and the fuel is injected into the cylinder in the retard period from the late stage of the compression stroke to the early stage of the expansion stroke. In this manner, similar to above, the pre-ignition in the compression stroke period is avoided while the combustion in the expansion stroke period is stabilized.

Then, immediately after the operating state of the engine body is shifted from the second operating state where the spark-ignition combustion is performed to the specific part of the first operating range, the compression-ignition initial mode where the injection timing is retarded later than that set in the retard period is performed. The injection timing in the compression-ignition initial mode may be in the retard period, and may be advanced earlier than the retard period. Thus, the pre-ignition can be surely avoided, and the increase of the combustion noises can surely be avoided.

After the in-cylinder temperature is decreased by performing the compression-ignition initial mode, the fuel injection timing is advanced to the injection timing set in the retard period. Thus, the injection timing approaches to the CTDC corresponding to the advanced amount of the fuel injection timing. This is advantageous in securing a necessary torque while avoiding the pre-ignition within the relatively higher specific engine load part of the first operating range.

The first operating range may be a low engine load range where the engine load is below a predetermined load, and the second operating range may be a high engine load range where the engine load is above the predetermined load.

According to the above configuration, the shifting from the second operating range to the specific part of the first operating range corresponds to the shifting of the operating state of the engine body from the higher engine load range to the low engine load range. Therefore, as described above, it may become advantageous in avoiding the increase of the combustion noises in the combustion ignition initial mode.

Within a low engine load part of the first operating range, the controller may control the fuel pressure setting mechanism to set the fuel pressure to a low fuel pressure of below 30 MPa and may control the fuel injection valve to perform the fuel injection at least in the period from the intake stoke to a middle stage of the compression stroke.

DETAILED DESCRIPTION OF EMBODIMENTS

Figure 1:
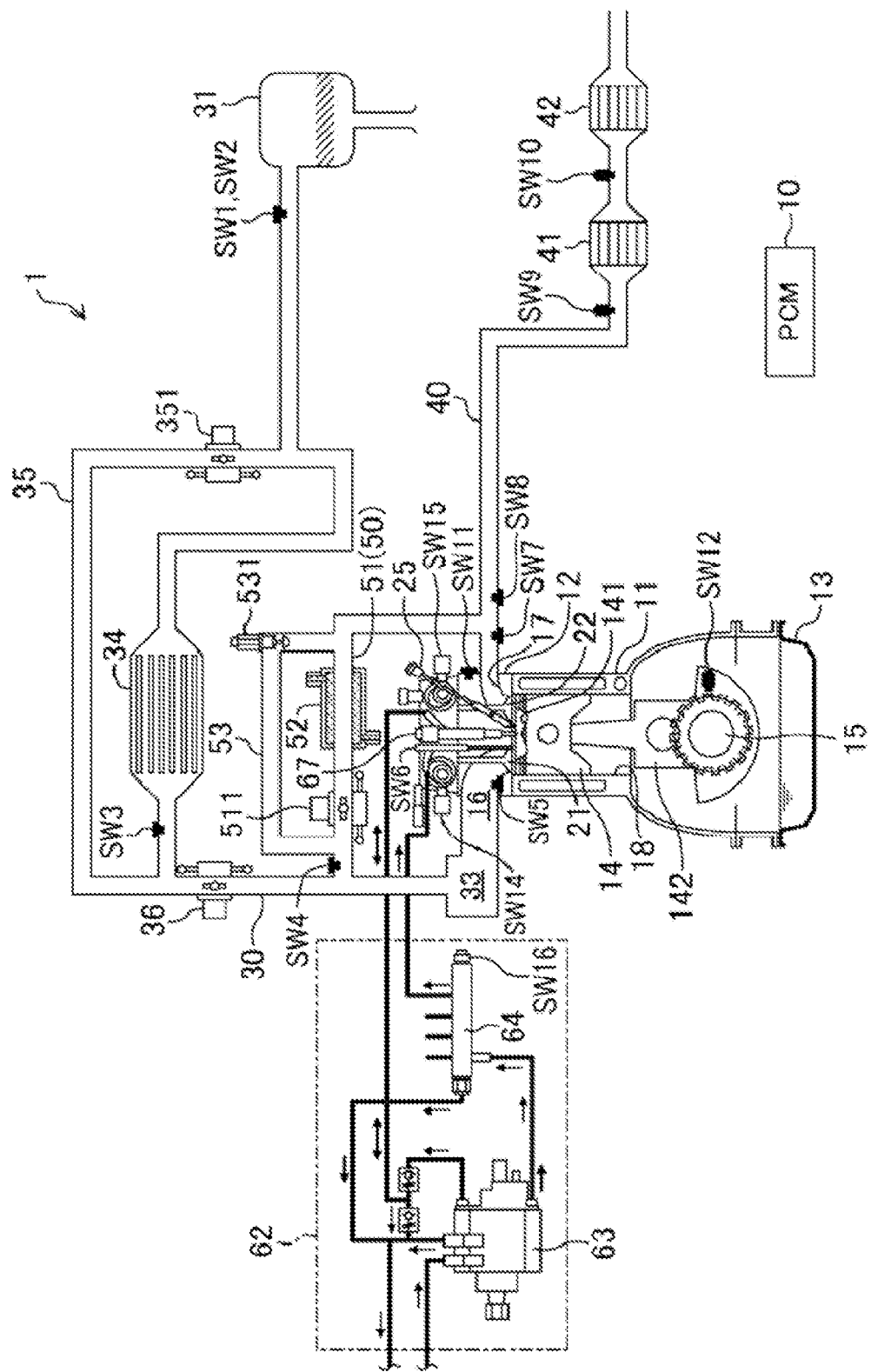
FIG. 1 is a schematic diagram showing a configuration of a spark-ignition direct injection engine.
Figure 2:
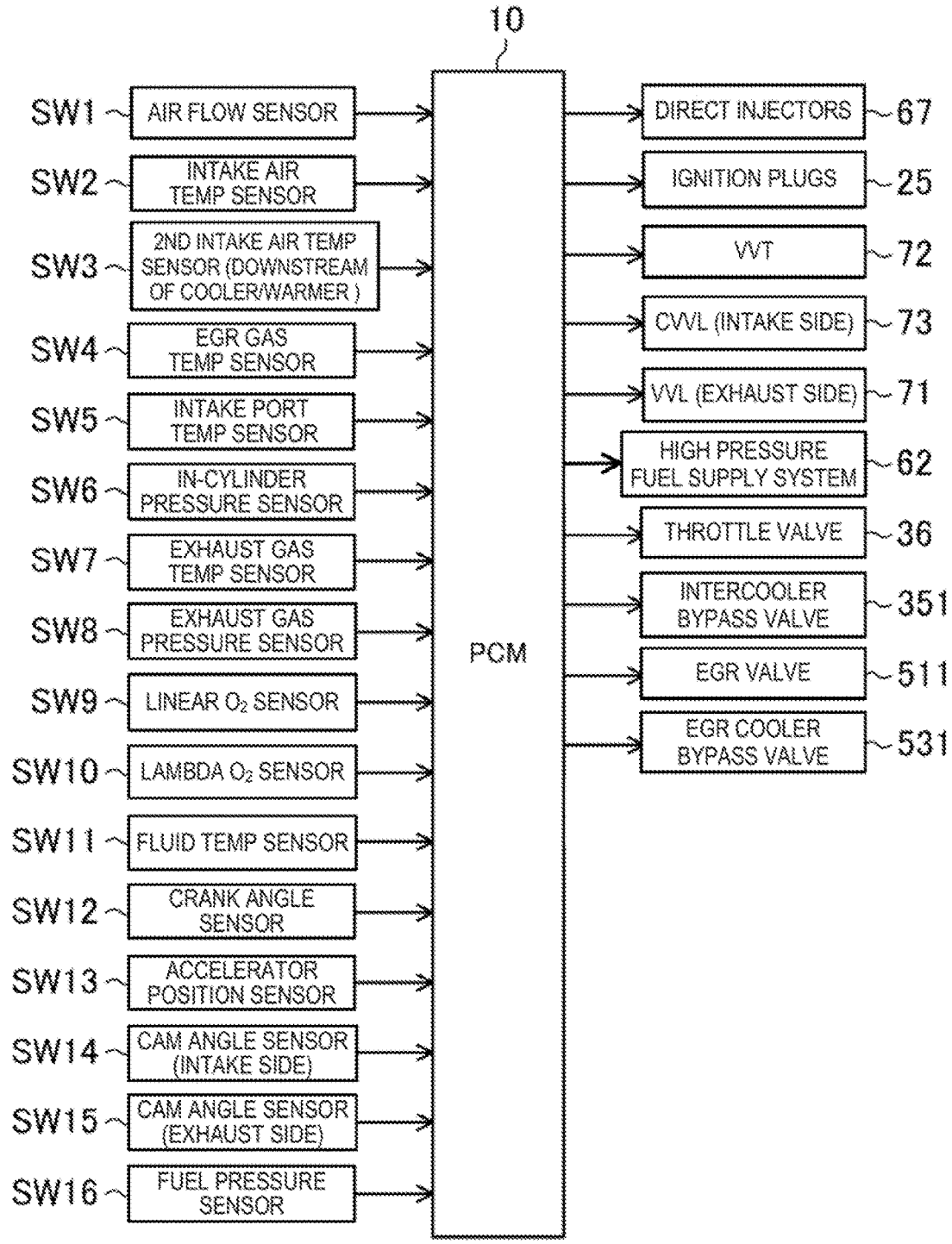
FIG. 2 is a block diagram relating to a control of the spark-ignition direct injection engine.
Figure 3:
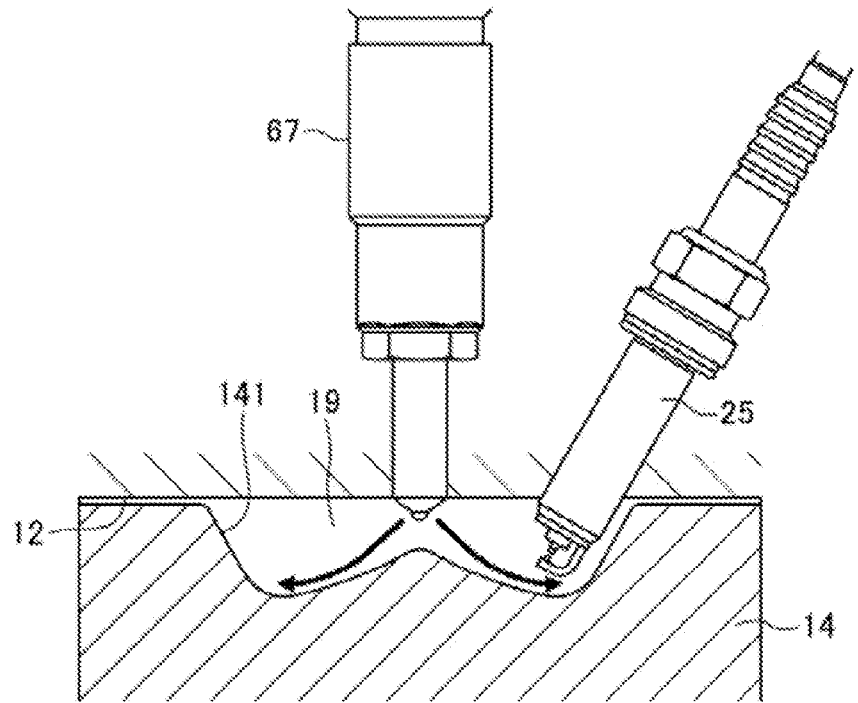
FIG. 3 is a cross-sectional view showing a combustion chamber in an enlarged manner.

Hereinafter, a spark-ignition direct injection engine according to embodiments of the present invention is described in detail with reference to the appended drawings. The following description of the preferred embodiments is an illustration. FIGS. 1 and 2 show a schematic configuration of an engine 1 (engine body) of this embodiment. The engine 1 is a spark-ignition gasoline engine that is equipped in a vehicle and supplied with fuel containing at least gasoline. The engine 1 includes a cylinder block 11 provided with a plurality of cylinders 18 (note that, although only one cylinder is illustrated in FIG. 1, here, four cylinders are linearly provided, for example), a cylinder head 12 arranged on the cylinder block 11, and an oil pan 13 arranged below the cylinder block 11 and where a lubricant is stored. Inside the cylinders 18, reciprocating pistons 14 coupled to a crankshaft 15 via connecting rods 142, respectively, are fitted. As shown in FIG. 3 in an enlarged manner, a cavity 141 having a reentrant shape such as the one used in a diesel engine, is formed on a top face of each piston 14. When the piston 14 is at a position near a compression top dead center (CTDC), the cavity 141 faces toward an injector 67 described later. The cylinder head 12, the cylinders 18, and the pistons 14 each formed with the cavity 141 partition combustion chambers 19. Note that, the shape of the combustion chamber 19 is not limited to the shape in the illustration. For example, the shape of the cavity 141, the shape of the top face of the piston 14, and the shape of a ceiling part of the combustion chamber 19 may suitably be changed.

A geometric compression ratio of the engine 1 is set comparatively high to be 15:1 or above so as to improve a theoretical thermal efficiency and stabilize compression-ignition combustion (described later). Note that, the geometric compression ratio may suitably be set within a range of 15:1 to about 20:1.

In the cylinder head 12, an intake port 16 and an exhaust port 17 are formed, and an intake valve 21 for opening and closing the opening of the intake port 16 on the combustion chamber 19 side and an exhaust valve 22 for opening and closing the opening of the exhaust port 17 on the combustion chamber 19 side are arranged for each of the cylinders 18.

In a valve train system of the engine 1 for operating the intake and exhaust valves 21 and 22, a mechanism such as a hydraulically-actuated variable valve mechanism 71 (see FIG. 2, hereinafter, may be referred to as the VVL (Variable Valve Lift)) for switching an operation mode of the exhaust valve 22 between a normal mode and a special mode is provided on an exhaust side. The VVL 71 (the detailed configuration is not illustrated) is configured to include two kinds of cams with different cam profiles from each other in which a first cam has one cam lobe and a second cam has two cam lobes, and a lost motion mechanism for selectively transmitting an operation state of either one of the first and second cams to the exhaust valve. When the lost motion mechanism transmits the operation state of the first cam to the exhaust valve 22, the exhaust valve 22 operates in the normal mode where it opens only once during exhaust stroke. On the other hand, when the lost motion mechanism transmits the operation state of the second cam to the exhaust valve 22, the exhaust valve 22 operates in the special mode where it opens once during the exhaust stroke and once more during intake stroke, which is a so called an exhaust open-twice control. The normal and special modes of the VVL 71 are switched therebetween according to an operating state of the engine. Specifically, the special mode is utilized for a control related to an internal EGR. Hereinafter, the processing of operating the VVL 71 in the normal mode so as not to perform the exhaust open-twice control may be referred to as "turning the VVL 71 off," and the processing of operating the VVL 71 in the special mode so as to perform the exhaust open-twice control may be referred to as "turning the VVL 71 on." Note that, an electromagnetically-operated valve system for operating the exhaust valve 22 by using an electromagnetic actuator may be adopted for switching between the normal and special modes. Further, the execution of the internal EGR is not limited to the exhaust open-twice control, and it may be achieved through, for example, an internal EGR control by an intake open-twice control or through an internal EGR control where burned gas is left in the cylinder 18 by setting a negative overlap period where both of the intake and exhaust valves 21 and 22 are closed during the exhaust stroke or the intake stroke.

While the valve train system on the exhaust side is provided with the VVL 71, as shown in FIG. 2, a phase variable mechanism 72 (hereinafter, may be referred as the VVT (Variable Valve Timing)) for changing a rotational phase of an intake camshaft with respect to the crankshaft 15 and a lift variable mechanism 73 (hereinafter, may be referred as the CVVL (Continuously Variable Valve Lift) for continuously changing a lift of the intake valve 21 are provided on an intake side of the valve train system. A well-known hydraulic, electromagnetic or mechanical structure may suitably be adopted for the VVT 72 (a detailed structure is not illustrated). Further, various kinds of well-known structures may suitably be adopted for the CVVL 73 (a detailed structure is not illustrated). Open and close timings and the lift of the intake valve 21 can be changed by the VVT 72 and the CVVL 73, respectively.

For each cylinder 18, the injector 67 for directly injecting the fuel into the cylinder 18 is attached to the cylinder head 12. As shown in an enlarged manner in FIG. 3, a nozzle hole of the injector 67 is arranged in a center part of the ceiling face of the combustion chamber 19 to be oriented toward inside the combustion chamber 19. The injector 67 directly injects the fuel into the combustion chamber 19 by an amount according to the operating state of the engine 1 at an injection timing set according to the operating state of the engine 1. In this embodiment, the injector 67 (a detailed configuration is not illustrated) is a multi hole injector formed with a plurality of nozzle holes. Thus, the injector 67 injects the fuel so that the fuel spray spreads radially from the central position of the combustion chamber 19. As indicated by the arrows in FIG. 3, at a timing corresponding to the piston 14 reaching the position near the CTDC, the fuel spray injected to spread radially from the center part of the combustion chamber 19 flows along a wall surface of the cavity 141 formed on the piston top face. Therefore, it may be said that the cavity 141 is formed to contain therein the fuel spray injected at the timing corresponding to the piston 14 reaching the position near the CTDC. The combination of the multi hole injector 67 and the cavity 141 is advantageous in, after the fuel is injected, shortening a gas mixture forming period and the combustion period. Note that, the injector 67 is not limited to the multi hole injector, and may be an outward opening valve type injector.

A fuel supply path couples between a fuel tank (not illustrated) and the injectors 67. A fuel supply system 62 having a fuel pump 63 and a common rail 64 and for supplying the fuel to each of the injectors 67 at a comparatively high fuel pressure is provided within the fuel supply path. The fuel pump 63 pumps the fuel from the fuel tank to the common rail 64, and the common rail 64 can accumulate the pumped fuel at a comparatively high fuel pressure. By opening the nozzle holes of the injector 67, the fuel accumulated in the common rail 64 is injected from the nozzle holes of the injector 67. Here, the fuel pump 63 is a plunger type pump (not illustrated) and is operated by the engine 1. The fuel supply system 62 including the engine-operated pump enables the supply of fuel to the injector 67 at a high fuel pressure of 30 MPa or above. The fuel pressure may be set to about 120 MPa at the maximum. As described later, the pressure of the fuel to be supplied to the injector 67 is changed according to the operating state of the engine 1. Note that, the fuel supply system 62 is not limited to the above configuration.

Further, in the cylinder head 12, as shown in FIG. 3, an ignition plug 25 for igniting gas mixture inside the combustion chamber 19 is attached for each cylinder 18. In this embodiment, the ignition plug 25 is arranged penetrating the cylinder head 12 so as to extend obliquely downward from the exhaust side of the engine 1. As shown in FIG. 3, a tip of the ignition plug 25 is oriented toward inside the cavity 141 of the piston 14 at the CTDC.

On one side surface of the engine 1, as shown in FIG. 1, an intake passage 30 is connected to communicate with each of the intake ports 16 of the cylinders 18. On the other side of the engine 1, an exhaust passage 40 is connected to lead out the burned gas (exhaust gas) discharged from each of the combustion chambers 19 of the cylinders 18.

An air cleaner 31 for filtrating intake air is arranged in an upstream end part of the intake passage 30. A surge tank 33 is arranged near a downstream end of the intake passage 30. A part of the intake passage 30 downstream of the surge tank 33 is branched to be independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are arranged between the air cleaner 31 and the surge tank 33 in the intake passage 30. Further, an intercooler bypass passage 35 for bypassing the intercooler/warmer 34 is connected within the intake passage 30, and an intercooler bypass valve 351 for adjusting an air flow rate passing through the passage 35 is arranged within the intercooler bypass passage 35. A ratio of a flow rate of the intercooler bypass passage 35 and a flow rate of the intercooler/warmer 34 are adjusted through adjusting an opening of the intercooler bypass valve 351, and thus, a temperature of fresh air to be introduced into the cylinder 18 can be adjusted.

An upstream part of the exhaust passage 40 is constituted with an exhaust manifold having independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underbody catalyst 42 are connected as an exhaust emission control system for purifying hazardous components contained in the exhaust gas. Each of the direct catalyst 41 and the underbody catalyst 42 includes a cylinder case and, for example, a three-way catalyst arranged in a flow passage within the case.

A part of the intake passage 30 between the surge tank 33 and the throttle valve 36 is connected with a part of the exhaust passage 40 on the upstream side of the direct catalyst 41 via an EGR passage 50 for recirculating a part of the exhaust gas to the intake passage 30. The EGR passage 50 includes a main passage 51 arranged with an EGR cooler 52 for cooling the exhaust gas by an engine coolant, and an EGR cooler bypass passage 53 for bypassing the EGR cooler 52. An EGR valve 511 for adjusting a recirculation amount of the exhaust gas to the intake passage 30 is arranged within the main passage 51. An EGR cooler bypass valve 531 for adjusting a flow rate of the exhaust gas flowing through the EGR cooler bypass passage 53 is arranged within the EGR cooler bypass passage 53.

The diesel engine 1 with the configuration described as above is controlled by a powertrain control module 10 (hereinafter, may be referred to as the PCM). The PCM 10 is configured with a CPU, a memory, a counter timer group, an interface, and a microprocessor with paths for connecting these units. The PCM 10 configures the controller.

As shown in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air that are arranged on the downstream side of the air cleaner 31; a second intake air temperature sensor SW3 arranged on the downstream side of the intercooler/warmer 34 and for detecting the temperature of the fresh air after passing through the intercooler/warmer 34; an EGR gas temperature sensor SW4 arranged near a connecting part of the EGR passage 50 with the intake passage 30 and for detecting the temperature of external EGR gas; an intake port temperature sensor SW5 attached to the intake port 16 and for detecting the temperature of the intake air immediately before flowing into the cylinder 18; an in-cylinder pressure sensor SW6 attached to the cylinder head 12 and for detecting the pressure inside the cylinder 18; an exhaust gas temperature sensor SW7 and an exhaust gas pressure sensor SW8 arranged near a connecting part of the exhaust passage 40 with the EGR passage 50 and for detecting the exhaust gas temperature and pressure, respectively; a linear $O_2$ sensor SW9 arranged on the upstream side of the direct catalyst 41 and for detecting an oxygen concentration within the exhaust gas; a lambda $O_2$ sensor SW10 arranged between the direct catalyst 41 and the underbody catalyst 42 and for detecting an oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW15; and a fuel pressure sensor SW16 attached to the common rail 64 of the fuel supply system 62 and for detecting the fuel pressure to be supplied to the injector 67.

By performing various kinds of operations based on these detection signals, the PCM 10 determines the state of the engine 1, and further the vehicle, and outputs control signals to the injectors 67, the ignition plugs 25, the VVT 72 and CVVL 73 on the intake valve side, the VVL 71 on the exhaust valve side, the fuel supply system 62, and the actuators of the various kinds of valves (throttle valve 36, intercooler bypass valve 351, the EGR valve 511, and the EGR cooler bypass valve 531) according to the determined state. In this manner, the PCM 10 operates the engine 1.

Figure 4:
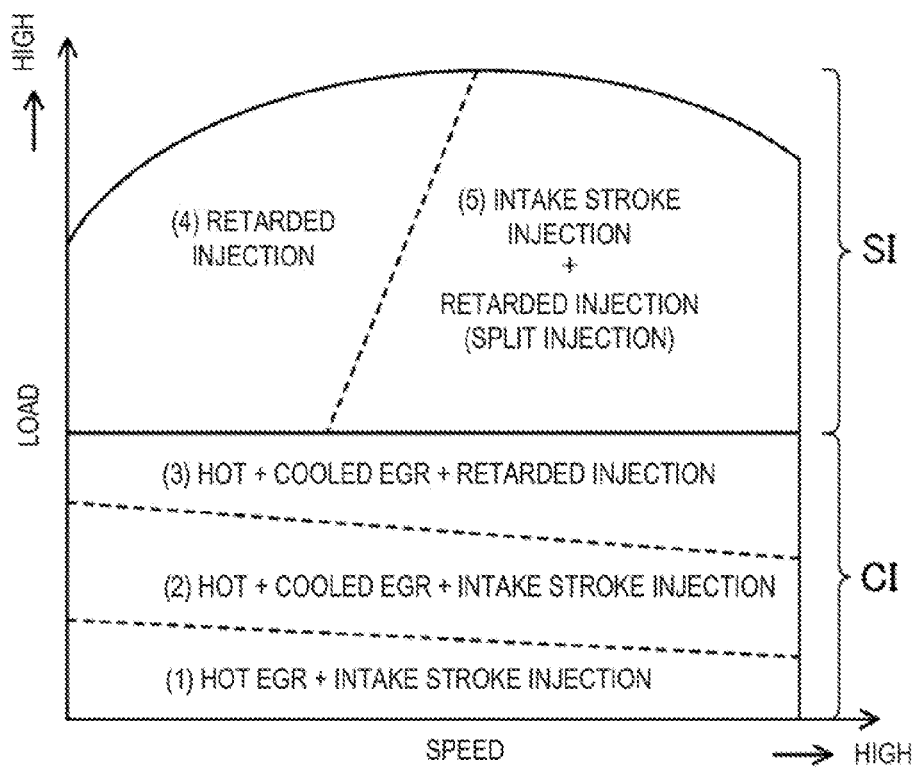
FIG. 4 is a chart exemplifying an operating range of the engine.

FIG. 4 shows one example of an operating range of the engine 1 in a warmed-up state. Within a low engine load range where an engine load is relatively low, the engine 1 does not perform an ignition by the ignition plug 25 and performs compression-ignition combustion in which a combustion is generated by a compression self-ignition, so as to improve fuel consumption and exhaust emission performance. However, with the compression-ignition combustion, the speed of the combustion becomes excessively rapid as the engine load increases, and thus, causes a problem of combustion noises, etc. Therefore, with the engine 1, within a high engine load range where the engine load is relatively high, the compression-ignition combustion is suspended and is switched to a spark-ignition combustion using the ignition plug 25. As above, the engine 1 is configured to switch a combustion mode according to the operating state of the engine 1, particularly the load of the engine 1, between a CI (Compression-Ignition) mode where the compression-ignition combustion is performed and an SI (Spark-Ignition) mode where the spark-ignition combustion is performed. Note that, the boundary line of switching the mode is not limited to the example in the illustration.

Figure 5A:
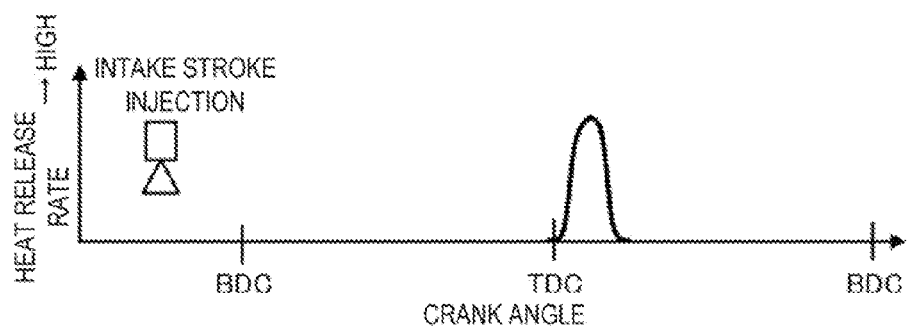
FIG. 5A shows one example of a fuel injection timing in a case where an intake stroke injection is performed in a CI mode and a heat release rate of CI combustion accompanied by the intake stroke injection.

The CI mode is divided into three ranges according to the levels of the engine load. Specifically, within a range (1) with the lowest engine load in the CI mode, hot EGR gas is introduced into the cylinder 18 to improve the ignitability and stability of the compression-ignition combustion. This is achieved by turning the VVL 71 on and performing the exhaust open-twice control of opening the exhaust valve 22 during the intake stroke. The introduction of the hot EGR gas increases the temperature at the CTDC, and is advantageous in improving the ignitability and stability of the compression-ignition combustion within the range (1) with low engine load. Moreover, within the range (1), as shown in FIG. 5A, the injector 67 injects the fuel into the cylinder 18 at least in a period between the intake stroke and the middle stage of the compression stroke, and thus a homogeneous lean gas mixture is formed. An air excess ratio $\lambda$ of the gas mixture may be set to, for example, 2.4:1 or higher to enable to suppress generation of raw NOx and improve the exhaust emission performance. Thus, as shown in FIG. 5A, the lean gas mixture is compressed to self-ignite near the CTDC.

Within a part of the range (1) with higher engine load than other parts, specifically, the part including the boundary between the range (1) and a range (2), even though the fuel is injected into the cylinder 18 at least in the period between the intake stroke and the middle stage of the compression stroke, the air-fuel ratio of the gas mixture is set to a theoretical air-fuel ratio ($\lambda \approx 1$). The setting to the theoretical air-fuel ratio enables use of a three-way catalyst, simplifies the control when switching between the SI and CI modes since the air-fuel ratio of the gas mixture is also the theoretical air-fuel ratio in the SI mode, and further, contributes in expanding the CI mode applicable range to the high load range side.

In the CI mode, within the range (2) with higher engine load than the range (1), similar to the higher engine load part of the range (1), the fuel is injected into the cylinder 18 at least in the period between the intake stroke and the middle stage of the compression stroke (see FIG. 5A), and the homogeneous gas mixture at the theoretical air-fuel ratio ($\lambda \approx 1$) is formed.

Moreover, within the range (2), since the temperature inside the cylinder 18 naturally increases according to the increase of the engine load, the hot EGR gas amount is reduced to avoid pre-ignition. This reduction is achieved by adjusting the internal EGR gas amount to be introduced into the cylinder 18. Moreover, by adjusting the amount of external EGR gas bypassing the EGR cooler 52, the amount of hot EGR gas may be adjusted.

Furthermore, within the range (2), cooled EGR gas is introduced into the cylinder 18. Thus, by introducing the hot EGR gas at a high temperature and the cooled EGR gas at a low temperature into the cylinder 18 at a suitable ratio, the temperature inside the cylinder 18 at the CTDC is adjusted appropriately, a rapid combustion is avoided while securing the ignitability of the compression-ignition, and the compression-ignition combustion is stabilized. Note that, an EGR ratio (a ratio of the total EGR gas of the hot EGR gas and the cooled EGR gas introduced into the cylinder 18) is set as high as possible under the condition that the air fuel ratio of the gas mixture is set to achieve $\lambda \approx 1$. Therefore, within the range (2), the fuel injection amount increases as the engine load increases, and thus, the EGR ratio gradually reduces.

Figure 5B:
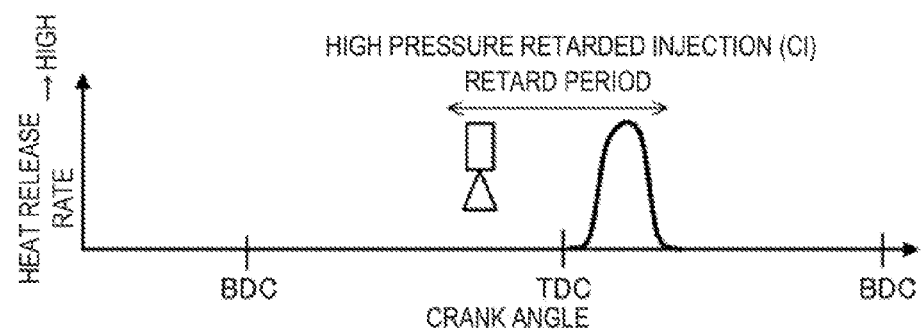
FIG. 5B shows one example of a fuel injection timing in a case where a high pressure retarded injection is performed in the CI mode and a heat release rate of the CI combustion accompanied by the high pressure retarded injection.

Within a range (3) with the highest engine load in the CI mode which includes a switching boundary between the CI mode and the SI mode, if the fuel is injected into the cylinder 18 in the period between the intake stroke and the middle stage of the compression stroke, it causes abnormal combustion (e.g., pre-ignition). On the other hand, if a large amount of cooled EGR gas is introduced to reduce the in-cylinder temperature at the CTDC, then the ignitability of the compression-ignition will degrade. In other words, since the compression-ignition combustion cannot be performed stably only by controlling the temperature inside the cylinder 18, within the range (3), by devising the fuel injection mode in addition to the temperature control of the cylinder 18, the compression-ignition combustion can be stabilized while avoiding the abnormal combustion, (e.g., pre-ignition). Specifically, in the fuel injection mode, as shown in FIG. 5B, the fuel is injected into the cylinder 18 at least in a period between the late stage of the compression stroke and the early stage of the expansion stroke (hereinafter, the period is referred to as the retard period) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (3). The details of the high pressure retarded injection will be described later.

Within the range (3), the hot EGR gas and the cooled EGR gas are introduced into the cylinder 18 at a suitable ratio similarly to the range (2). Thus, the temperature inside the cylinder 18 at the CTDC is adjusted appropriately and the compression-ignition combustion is stabilized.

While the CI mode has three divided ranges according to the engine load, the SI mode is divided into two ranges (4) and (5) according to the engine speed. When the operating range of the engine 1 is divided into two higher and lower speed ranges, in FIG. 4, the range (4) corresponds to the lower engine speed range and the range (5) corresponds to the higher engine speed range. Although in the operating ranges shown in FIG. 4, the boundary between the ranges (4) and (5) extending with respect to the engine load is inclined in the engine speed direction, the boundary is not limited to the illustrated example.

In each of the ranges (4) and (5), the gas mixture is set to the theoretical air-fuel ratio ($\lambda \approx 1$) similar to the ranges (2) and (3). Therefore, the air-fuel ratio of the gas mixture is fixed at the theoretical air-fuel ratio ($\lambda \approx 1$) over the boundary between the CI mode and the SI mode, and this enables use of a three-way catalyst. Moreover, within the ranges (4) and (5), the throttle valve 36 is basically fully opened and the fresh air amount and the external EGR gas amount to be introduced into the cylinder 18 are adjusted by the opening adjustment of the EGR valve 511. Such adjustment of the ratio of gas introduced into the cylinder 18 reduces a pumping loss, and by introducing a large amount of EGR gas into the cylinder 18, the combustion temperature of the spark-ignition combustion is suppressed low to reduce a cooling loss. Within the ranges (4) and (5), the external EGR gas cooled mainly by passing through the EGR cooler 52 is introduced into the cylinder 18. Thus, the abnormal combustion is advantageously avoided and the generation of raw Nox is suppressed. Note that, within a full engine load range, the EGR valve 511 is fully closed to cancel the external EGR.

Note that, within the ranges (4) and (5), the EGR gas is not introduced, but while the introduction may be suspended, the opening of the throttle valve 36 may be controlled according to the fuel injection amount to adjust the fresh air amount introduced into the cylinder 18 so that the air-fuel ratio becomes the theoretical air-fuel ratio ($\lambda \approx 1$).

The geometric compression ratio of the engine 1 is, as described above, set to 15:1 or above (e.g., 18:1). Since a high compression ratio increases the in-cylinder temperature and the in-cylinder pressure at the CTDC, it is advantageous in stabilizing the compression-ignition combustion in the CI mode, especially within the low engine load range of the CI mode (e.g., the range (1)). In contrast, in the SI mode corresponding to the high engine load range, this high compression ratio engine 1 causes a problem that the abnormal combustion (e.g., pre-ignition and knocking) easily occurs.

Figure 5C:
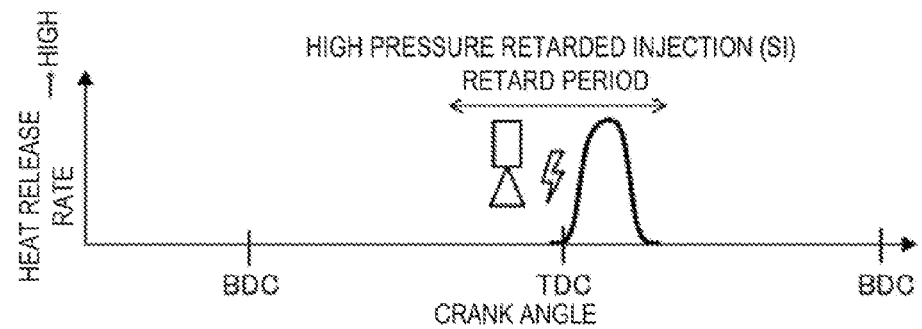
FIG. 5C shows one example of a fuel injection timing and an ignition timing in a case where the high pressure retarded injection is performed in an SI mode and a heat release rate of the SI combustion accompanied by the high pressure retarded injection.
Figure 5D:
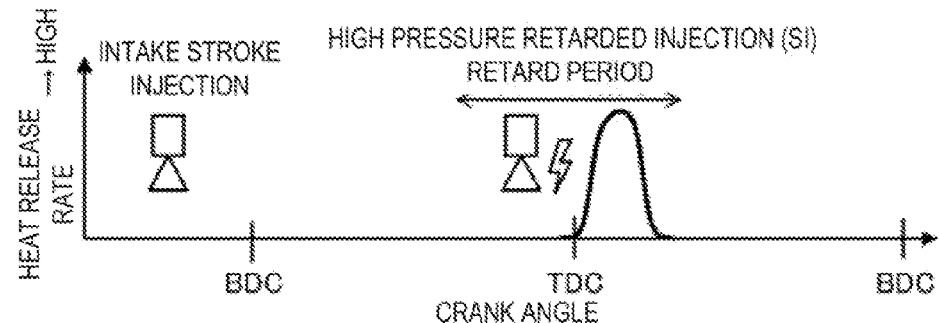
FIG. 5D shows one example of a fuel injection timing and an ignition timing in a case where split injections of the intake stroke injection and the high pressure retarded injection are performed in the SI mode and a heat release rate of the SI combustion accompanied by the split injections.

Thus, with the engine 1, the high pressure retarded injection is performed within the ranges (4) and (5) of the SI mode to avoid the abnormal combustion. Specifically, within the range (4), at a high fuel pressure of 30 MPa or above, as shown in FIG. 5C, only the high pressure retarded injection is performed, in which the fuel is injected into the cylinder 18 in the retard period between the late stage of the compression stroke and the early stage of the expansion stroke. On the other hand, within the range (5), as shown in FIG. 5D, a part of the fuel for injection is injected into the cylinder 18 in an intake stroke period where the intake valve 21 is opened, and the rest of the fuel for the injection is injected into the cylinder 18 within the retard period. In other words, within the range (5), a split injection of fuel is performed. Here, the intake stroke period where the intake valve 21 is opened is a period defined based on open and close timings of the intake valve, and not a period defined based on the piston position. Here, the end of the intake stroke may vary with respect to the timing at which the piston reaches an intake bottom dead center (IBDC) depending on the close timing of the intake valve 21 which is changed by the CVVL 73 and the VVT 72.

Next, the high pressure retarded injection in the SI mode is described with reference to FIG. 6, which shows charts comparing differences in a heat release rate (upper chart) and an extent of reaction of unburned gas mixture (lower chart) between an SI combustion caused by the high pressure retarded injection described above (solid line) and the conventional SI combustion in which the fuel injection is performed during the intake stroke (broken line). The lateral axis in FIG. 6 indicates the crank angle. The comparison is performed under a condition that the operating state of the engine 1 is within the lower engine speed range with high engine load (i.e., the range (4)), and a fuel amount to be injected is the same between the SI combustion caused by the high pressure retarded injection and the conventional SI combustion.

First, for the conventional SI combustion, a predetermined amount of fuel is injected into the cylinder 18 during the intake stroke (broken line in the upper chart). After the fuel injection, comparatively homogeneous gas mixture is formed inside the cylinder 18 before the piston 14 reaches the CTDC. Further, in this case, the ignition is performed at a predetermined timing indicated by the first white circle after the CTDC, and then the combustion starts. After the combustion starts, as indicated by the broken line in the upper chart of FIG. 6, the combustion ends after progressing through a peak of the heat release rate. A period from the start of the fuel injection until the end of the combustion corresponds to a reactable time length of unburned gas mixture (hereinafter, may simply be referred to as the reactable time length) and, as indicated by the broken line in the lower chart of FIG. 6, the reaction of the unburned gas mixture gradually progresses within the reactable time length. The dotted line in the lower chart indicates an ignition threshold (i.e., a reactivity of the unburned gas mixture being ignited). The conventional SI combustion has, in combination with within the low engine speed range, an extremely long reactable time length, and the reaction of the unburned gas mixture keeps progressing for the reactable time length, and therefore, the reactivity of the unburned gas mixture exceeds the ignition threshold around the ignition timing, causing the abnormal combustion (e.g., pre-ignition and knocking).

On the other hand, the high pressure retarded injection aims to avoid the abnormal combustion by shortening the reactable time length. As shown in FIG. 6, the reactable time length in this case is a total time length of a period where the injector 67 injects the fuel ((1) an injection period), a period from the end of the injection until combustible gas mixture is formed around the ignition plug 25 ((2) a gas mixture forming period), and a period from the start of the combustion started by the ignition until the combustion ends ((3) a combustion period), in other words, (1)+(2)+(3). The high pressure retarded injection shortens each of the injection period, the gas mixture forming period, and the combustion period, and thereby, shortens the reactable time length. The methods of shortening the periods are explained sequentially.

First, a high fuel pressure relatively increases the fuel injection amount injected from the injector 67 per unit time. Therefore, in a case where the fuel injection amount is fixed, a relation between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the fuel spray injected into the cylinder 18 and further extends a spreading distance of the fuel spray. Therefore, a relation between the fuel pressure and a fuel vaporization time length substantially becomes as follows: the fuel vaporization time length extends as the fuel pressure decreases, and the fuel vaporization time length contracts as the fuel pressure increases. Further, a relation between the fuel pressure and a time length for the fuel spray to reach around the ignition plug 25 (the fuel spray reaching time length) substantially becomes as follows: the fuel spray reaching time length extends as the fuel pressure decreases, and the fuel spray reaching time length contracts as the fuel pressure increases. The gas mixture forming period corresponds to a total time length of the fuel vaporization time length and the fuel spray reaching time length to around the ignition plug 25; therefore, the gas mixture forming period contracts as the fuel pressure increases. Therefore, the high pressure retarded injection in which the fuel pressure is set significantly higher than the conventional pressure shortens the fuel vaporization time length and the fuel spray reaching time length to around the ignition plug 25 and, as a result, shortens the gas mixture forming period. On the other hand, as indicated by the white circles of the chart in FIG. 6, with the conventional intake stroke injection with the low fuel pressure, the gas mixture forming period is significantly longer. Note that, the combination of the multi hole injector 67 and the cavity 141 shortens the time length from the end of the fuel injection until when the fuel spray reaches around the ignition plug 25 and, as a result, becomes advantageous in shortening the gas mixture forming period.

As above, shortening the injection period and the gas mixture forming period enables to retard the injection timing of the fuel, more precisely, retard the injection start timing to a comparatively late timing. Therefore, as shown in the upper chart of FIG. 6, with the high pressure retarded injection, the fuel injection is performed within the retard period between the late stage of the compression stroke and the early stage of the expansion stroke. Although, due to injecting the fuel into the cylinder 18 at the high fuel pressure, the turbulence of flow inside the cylinder becomes stronger and a turbulence kinetic energy inside the cylinder 18 increases, the high turbulence kinetic energy is, in combination with retarding the fuel injection timing to the comparatively late timing, advantageous in shortening the combustion period.

In other words, in a case where the fuel injection is performed within the retard period, a relation between the fuel pressure and the turbulence kinetic energy within the combustion period substantially becomes as follows: the turbulence kinetic energy decreases as the fuel pressure decreases, and the turbulence kinetic energy increases as the fuel pressure increases. Here, even if the fuel is injected into the cylinder 18 at the high fuel pressure, in the case where the injection timing is on the intake stroke, due to the time length until the ignition timing being long and inside the cylinder 18 being compressed on the compression stroke after the intake stroke, the turbulence inside the cylinder 18 is subsided. As a result, in the case where the fuel injection is performed during the intake stroke, the turbulence kinetic energy within the combustion period becomes comparatively low regardless of the fuel pressure.

A relation between the turbulence kinetic energy within the combustion period and the combustion period substantially becomes as follows: the combustion period extends as the turbulence kinetic energy decreases and the combustion period contracts as the turbulence kinetic energy increases. Therefore, a relation between the fuel pressure and the combustion period becomes as follows: the combustion period extends as the fuel pressure decreases and the combustion period contracts as the fuel pressure increases. In other words, the high pressure retarded injection shortens the combustion period. On the other hand, with the conventional intake stroke injection with the low fuel pressure, the combustion period extends. Note that, the multi hole injector 67 is advantageous in increasing the turbulence kinetic energy inside the cylinder 18 and shortening the combustion period. Moreover, it is also advantageous in shortening the combustion period to keep the fuel spray contained within the cavity 141 by the combination of the multi hole injector 67 and the cavity 141.

Figure 6:
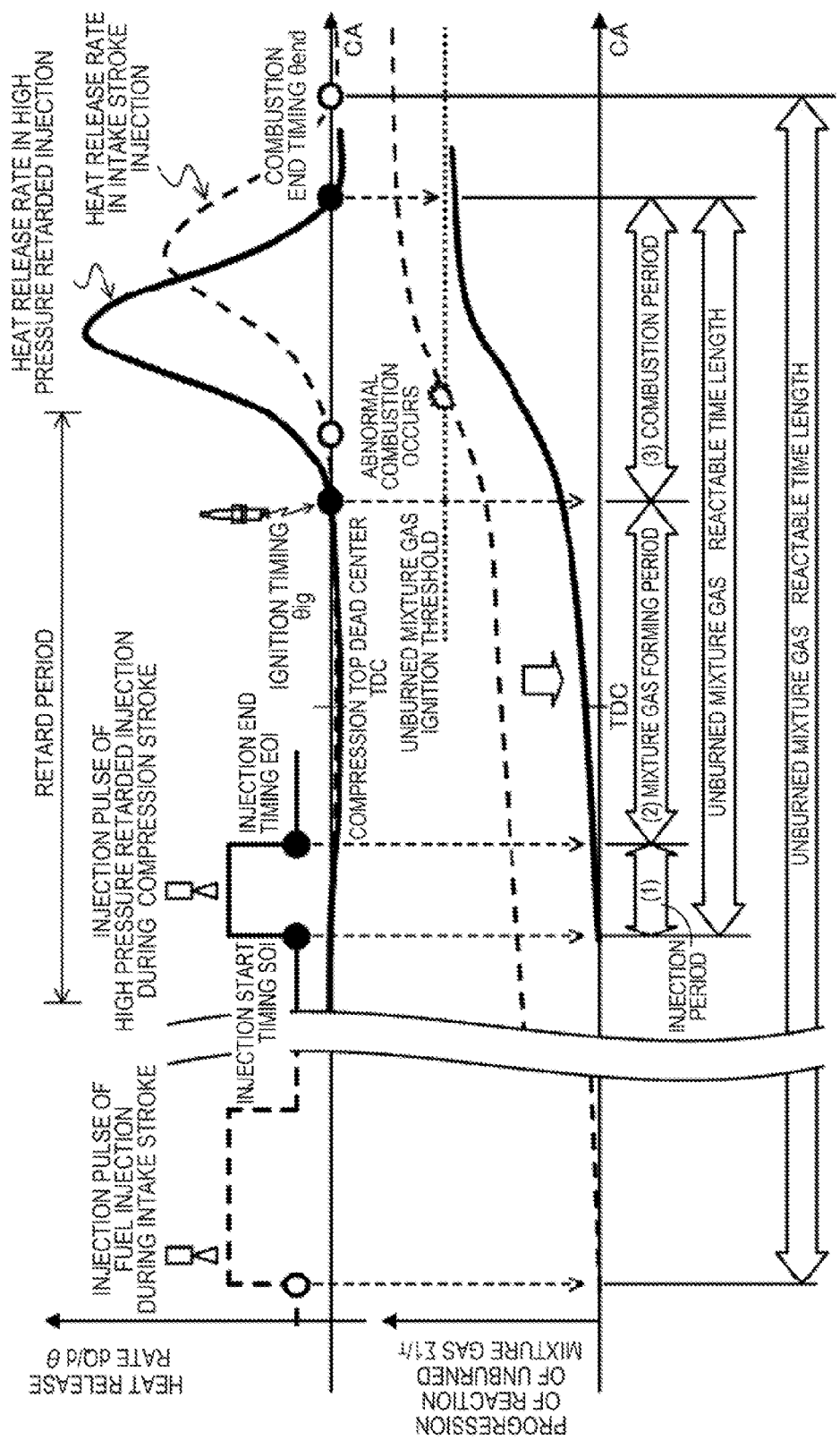
FIG. 6 shows charts comparing a state of the SI combustion caused by the high pressure retarded injection and the conventional SI combustion.

As above, the high pressure retarded injection shortens each of the injection period, the gas mixture forming period, and the combustion period, and as a result, as shown in FIG. 6, the high pressure retarded injection can significantly shorten the reactable time length of the unburned gas mixture from a fuel injection start timing SOI to a combustion end timing, ° end, compared to the conventional case where the fuel injection is performed during the intake stroke. As a result of shortening the reactable time length, as shown in the upper chart of FIG. 6, while the extent of reaction of the unburned gas mixture at the end of the combustion exceeds the ignition threshold and the abnormal combustion occurs with the conventional intake stroke injection with the low fuel pressure as indicated by the white circles, with the high pressure retarded injection, as indicated by the black circles, the progression of the reaction of the unburned gas mixture at the end of the combustion is suppressed and the abnormal combustion can be avoided. Note that, the ignition timings for cases indicated by the white and black circles in the upper chart of FIG. 6 are set to be the same timing.

By setting the fuel pressure to, for example, 30 MPa or above, the combustion period can effectively be shortened. Moreover, the fuel pressure of 30 MPa or above can also effectively shorten the injection period and the gas mixture forming period. Note that, the fuel pressure may be suitably set according to a type of fuel to be used which at least contains gasoline. The upper limit value of the fuel pressure may be 120 MPa, etc.

The high pressure retarded injection avoids the occurrence of abnormal combustion in the SI mode by devising the mode of the fuel injection into the cylinder 18. Other than such high pressure retarded injection, it has conventionally been known to avoid abnormal combustion by retarding the ignition timing. The retarded ignition timing suppresses the increases of the temperature and pressure of the unburned gas mixture and, thereby, suppresses the progression of the reaction of the unburned gas mixture. However, whereas the retarded ignition timing causes degradation of the thermal efficiency and reduction of the torque, when the high pressure retarded injection is performed, since the abnormal combustion is avoided by devising the mode of the fuel injection, the ignition timing can be advanced, and thus, the thermal efficiency can be improved and the torque can be increased. In other words, the high pressure retarded injection can, not only avoid the abnormal combustion, but also enable advancement of the ignition timing accordingly, and thereby, is advantageous in improving the fuel consumption.

As described above, the high pressure retarded injection in the SI mode can shorten each of the injection period, the gas mixture forming period, and the combustion period, while the high pressure retarded injection performed within the range (3) of the CI mode can shorten the injection period and the gas mixture forming period. In other words, by injecting the fuel at the high fuel pressure into the cylinder 18 to increase the turbulence inside the cylinder 18, the atomized fuel is more finely mixed, and even when the fuel injection is performed at the late timing near the CTDC, the comparatively homogeneous gas mixture can swiftly be formed.

In the high pressure retarded injection in the CI mode, by injecting the fuel at the late timing near the CTDC within the comparatively high engine load range, substantially homogeneous gas mixture is swiftly formed as described above while preventing pre-ignition in, for example, a compression stroke period. Therefore, after the CTDC, the compression ignition can surely be performed. Further, by performing the compression-ignition combustion in an expansion stroke period where the pressure inside the cylinder 18 decreases due to the rotation of the crankshaft of the engine, the combustion subsides, and excessive increase of the pressure (dP/dt) inside the cylinder 18 due to the compression-ignition combustion can be avoided. Thus, the conventional restrictions from NVH can be averted and, as a result, the range of the CI mode applicable range extends to the high load range side.

Returning to the SI mode, as described above, the high pressure retarded injection in the SI mode shortens the reactable time length of the unburned gas mixture by performing the fuel injection in the retard period; however, although the shortening of the reactable time length is advantageous within the low engine speed range where the engine speed is comparatively low because the actual reactable time length against the crank angle change is long, within the high engine speed range where the engine speed is comparatively high, since the actual reactable time length against the crank angle change is short, it is less advantageous. On the other hand, with the retarded injection, since the fuel injection timing is set to near the CTDC, on the compression stroke, the in-cylinder gas that does not include the fuel, in other words, air at high specific heat ratio is compressed. As a result, within the high engine speed range, the temperature inside the cylinder 18 at the CTDC increases, and this increased temperature at the CTDC causes knocking Therefore, when only performing the retarded injection within the range (5), there may be a case where it is required to retard the ignition timing to avoid knocking.

Therefore, within the range (5) where the engine speed is relatively high in the SI mode as shown in FIG. 4, a part of the fuel for injection is injected into the cylinder 18 in the intake stroke period, and the rest of the fuel for the injection is injected into the cylinder 18 in the retard period, as shown in FIG. 5D. With the intake stroke injection, the specific heat ratio of the in-cylinder gas on the compression stroke (i.e., the gas mixture including the fuel) may be reduced to suppress the in-cylinder temperature at the CTDC. By decreasing the in-cylinder temperature at the CTDC as above, knocking can be suppressed and, therefore, the ignition timing can be advanced.

Moreover, by performing the high pressure retarded injection, as described above, the turbulence inside the cylinder 18 (in the combustion chamber 19) near the CTDC becomes strong, and the combustion period becomes shorter. This shorter combustion period is also advantageous in suppressing knocking, and the ignition timing can further be advanced. Thus, within the range (5), by performing the split injection including the intake stroke injection and the high pressure retarded injection, the thermal efficiency can be improved while avoiding the abnormal combustion.

Note that, instead of performing the high pressure retarded injection, a multi-point ignition system may be adopted to shorten the combustion period within the range (5). Specifically, a plurality of ignition plugs is arranged to be oriented toward inside the combustion chamber 19, and within the range (5), the intake stroke injection is performed as well as each of the plurality of ignition plugs is controlled to perform a multi-point ignition. In this case, since a flame spreads from each of the plurality of fire sources inside the combustion chamber 19, the flame spreads rapidly and the combustion period becomes shorter. As a result, the combustion period is shortened similar to when adopting the high pressure retarded injection, and this shortened combustion period is advantageous in improving the thermal efficiency.

(Control when Switching from SI Mode to CI Mode)

Since spark-ignition combustion has a low thermal efficiency compared to compression-ignition combustion, the burned gas temperature is relatively high.

On the other hand, in the CI mode where the compression-ignition is performed, since the ignitability of the compression ignition is secured as described above, the internal or external EGR gas is introduced into the cylinder 18, the temperature inside the cylinder 18 is increased.

Immediately after the SI mode where the burned gas temperature is relatively high is switched to the CI mode, since the state inside the cylinder 18 is a high temperature atmosphere and the exhaust gas at the high temperature caused by the spark-ignition combustion is introduced into the cylinder 18, the compression-ignition combustion is performed while the temperature inside the cylinder 18 is high. In this case, if the fuel is injected into the cylinder 18 at a comparatively early timing (e.g., during the intake stroke), the pre-ignition is caused in the compression stroke period, and the pressure increase rate (dP/dt) inside the cylinder 18 may become significantly high to cause loud combustion noises.

Therefore, with the engine 1, various transient controls for avoiding the pre-ignition immediately after the switching from the SI mode to the CI mode and avoiding the increase of the combustion noises are performed.

Here, in the operation map in the warmed-up state shown in FIG. 4, the switching from the SI mode to the CI mode may correspond to shifting from the high engine load range where the load of the engine 1 corresponds to the SI mode, to the low engine load range where the load of the engine 1 corresponds to the CI mode. In other words, due to the reduction of the load of the engine 1, the SI mode is switched to the CI mode. Note that, the SI mode may be switched to the CI mode in the state where the load of the engine 1 is stable near the boundary between the SI and CI modes.

Moreover, in a cold-start or a warming-up state where the temperature of the engine 1 is below a predetermined temperature, since the compression-ignition combustion is not stable, the CI mode is not performed (not illustrated), and instead the SI mode is performed in the entire operating range of the engine 1. On the other hand, as shown in FIG. 4, in the warmed-up state where the temperature of the engine 1 is above a predetermined temperature, the CI mode is performed. Therefore, due to the temperature of the engine 1 increasing to the warmed-up state, the SI mode maybe switched to the CI mode while the engine load is stable.

(Compression-Ignition Initial Mode Using High Pressure Retarding Control)

Figure 7:
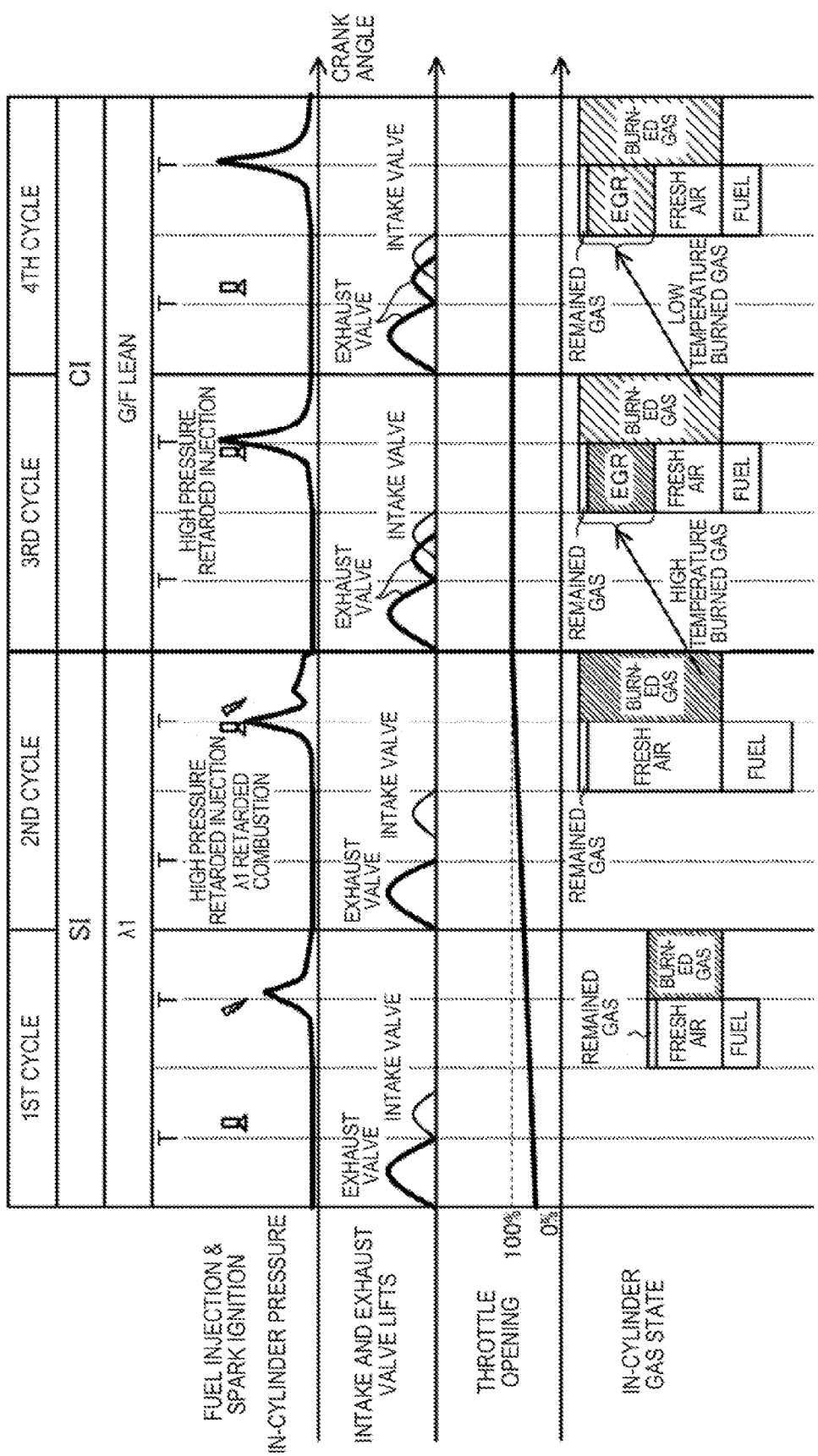
FIG. 7 is a time chart illustrating a control relating to the fuel injection in switching from the SI mode to the CI mode.

FIG. 7 shows one example of a control of performing a compression-ignition initial mode using the high pressure retarded injection to avoid the pre-ignition immediately after switching the combustion mode. Specifically, FIG. 7 shows one example of changes of the fuel injection timing and the spark-ignition timing, the change of the in-cylinder pressure, the change of the open state of the intake and exhaust valves, the change of the opening of the throttle valve, and the change of the in-cylinder gas state, in switching from the SI mode to the CI mode. In FIG. 7, the crank angle (i.e., time) proceeds from left to right in the chart therein. Note that, in FIG. 7, for clarity, the SI mode is switched to the CI mode while the load of the engine 1 is stable, and in the SI mode, the EGR gas is not introduced and the opening of the throttle valve 36 is adjusted.

Firstly, in a first cycle corresponding to the leftmost part in FIG. 7, the engine is operated in the SI mode, and here, the fuel injection is performed in the intake stroke period, and the spark ignition is performed near the CTDC. The air-fuel ratio of the gas mixture is set to the theoretical air-fuel ratio ($\lambda \approx 1$) and the throttle valve is throttled to obtain the fresh air amount suitable for the fuel injection amount (see the in-cylinder gas state shown in the lowest row of FIG. 7). Additionally, in the first cycle corresponding to the SI mode, the VVL 71 of the exhaust valve 22 is off (i.e., the internal EGR gas is not introduced).

The following second cycle corresponds to the cycle immediately before switching from the SI mode to the CI mode. Here, to prepare for switching to the CI mode where the throttle opening is set to be fully opened, the throttle valve is opened to the full opening direction to increase the gas amount (fresh air amount) inside the cylinder 18. The fuel amount suitable for the increased fresh air amount is injected to keep the theoretical air-fuel ratio. This fuel injection is the high pressure retarded injection described above, in which the fuel injection is performed near the CTDC and the spark ignition is performed after the CTDC. By retarding the spark-ignition timing as above, the stable engine load (stable torque) is maintained. Moreover, to prepare for switching to the CI mode where the VVL 71 is turned on, the open timing of the intake valve 21 is retarded later than the first cycle.

A third cycle corresponds to the cycle immediately after switching from the SI mode to the CI mode, where the compression-ignition initial mode is applied. In the CI mode (compression-ignition initial mode to be exact), the exhaust open-twice control is performed by turning the VVL 71 on. Thereby, a part of the burned gas produced by the spark-ignition combustion in the second cycle is introduced into the cylinder 18. Since the burned gas is produced by the spark-ignition combustion, the temperature thereof is comparatively high. As a result of the burned gas being introduced as above, the temperature inside the cylinder 18 becomes comparatively high.

The high pressure retarded injection is also used in the compression-ignition initial mode in the third cycle. In other words, the fuel injection is performed in the period from the late stage of the compression stroke to the early stage of the expansion stroke. By retarding the fuel injection timing as above, even if the temperature inside the cylinder 18 becomes comparatively high, the pre-ignition during the compression stroke period can be avoided.

Additionally, as described above, by the high pressure retarded injection, the comparatively lean gas mixture is formed at an early timing, and since the temperature inside the cylinder 18 is comparatively high, the lean gas mixture is surely compressed to ignite near or after the CTDC and stably combusts. Thus, the increase of the combustion noises immediately after switching from the SI mode to the CI mode is avoided.

The temperature of the burned gas from the compression-ignition combustion is relatively low. Moreover, in the CI mode, since the air-fuel ratio A/F of the gas mixture is set to the theoretical air-fuel ratio and the EGR gas is introduced, the ratio between the working gas and the fuel (G/F) becomes lean. Therefore, the burned gas temperature further decreases.

A fourth cycle corresponds to after the compression-ignition initial mode ends, and the VVL 71 is turned on therein similarly to the third cycle, a part of the burned gas produced by the compression-ignition combustion in the third cycle is introduced into the cylinder 18; however, since the temperature of the burned gas is comparatively low as described above, the temperature inside the cylinder 18 becomes low. Thus, the pre-ignition is avoided, and therefore, the fuel injection timing is set to during the intake stroke period. Thus, in combination of the strong intake air flow and the long gas mixture forming period, the lean gas mixture is formed and the lean gas mixture is compressed to ignite near the CTDC.

With reference to FIG. 7, the control which is performed while the load of the engine 1 is stable and when the SI mode is switched to the CI mode is described as an example. In the compression-ignition initial mode described above, it is particularly effective when the SI mode is switched to the CI mode due to the load of the engine 1 reducing from high to low as described above. This is because, in the case where the load of the engine 1 reduces from high to low, the burned gas temperature may become much higher within the high engine load range corresponding to the SI mode due to the fuel injection amount being relatively large therein. In this case, immediately after the SI mode is switched to the CI mode, the temperature inside the cylinder 18 becomes much higher and the pre-ignition is easily caused. However, as described above, in the compression-ignition initial mode, since the pre-ignition in the compression stroke period can surely be avoided by the high pressure retarded injection, the increase of the combustion noises at the time of the combustion mode switching due to the engine load reduction can surely be avoided.

Specific examples of the combustion mode switching due to the engine load reduction include shifting from the range (4) or (5) corresponding to the SI mode to the range (2) or (1) corresponding to the CI mode in the operation map in the warmed-up state shown in FIG. 4. That is, the compression-ignition initial mode may be performed immediately after shifting to the range (2) or (1). After the compression-ignition initial mode ends, the fuel injection timing may be advanced to the fuel injection timing set within the range (2) or (1) (i.e., in the period from the intake stroke to the middle stage of the compression stroke).

Here, since the range (3) corresponding to the CI mode is the range where the retarded injection is performed as described above, when shifting from the range (4) or (5) to the range (3), the performance of the compression-ignition initial mode may be omitted. Moreover, immediately after shifting from the range (4) or (5) to the range (3), the compression-ignition initial mode may be performed, in which the fuel injection is performed at a timing retarded later than the fuel injection timing set within the range (3) (i.e., the injection timing in the retard period). The injection timing described herein may be in the retard period or may be a timing retarded later than the retard period. After the compression-ignition initial mode ends, the injection timing may be advanced to be the fuel injection timing in the retard period which is set within the range (3).

Note that, as described above, in the case where the SI mode is switched to the CI mode while the engine load is stable due to the temperature of the engine 1 increasing and the cold start state shifts to the warmed-up state, the compression-ignition initial mode shown in FIG. 7 is effective in avoiding the increase of the combustion noises.

In the control example in FIG. 7, the compression-ignition initial mode is only performed in one cycle; however, it may be performed in a plurality of cycles. Moreover, in the control example in FIG. 7, the opening of the throttle valve 36 is adjusted without introducing the EGR gas; however, the EGR gas may be introduced.

(Transient Combustion Mode for Decreasing Burned Gas Temperature Immediately Before Switching Combustion Mode)

Figure 8:
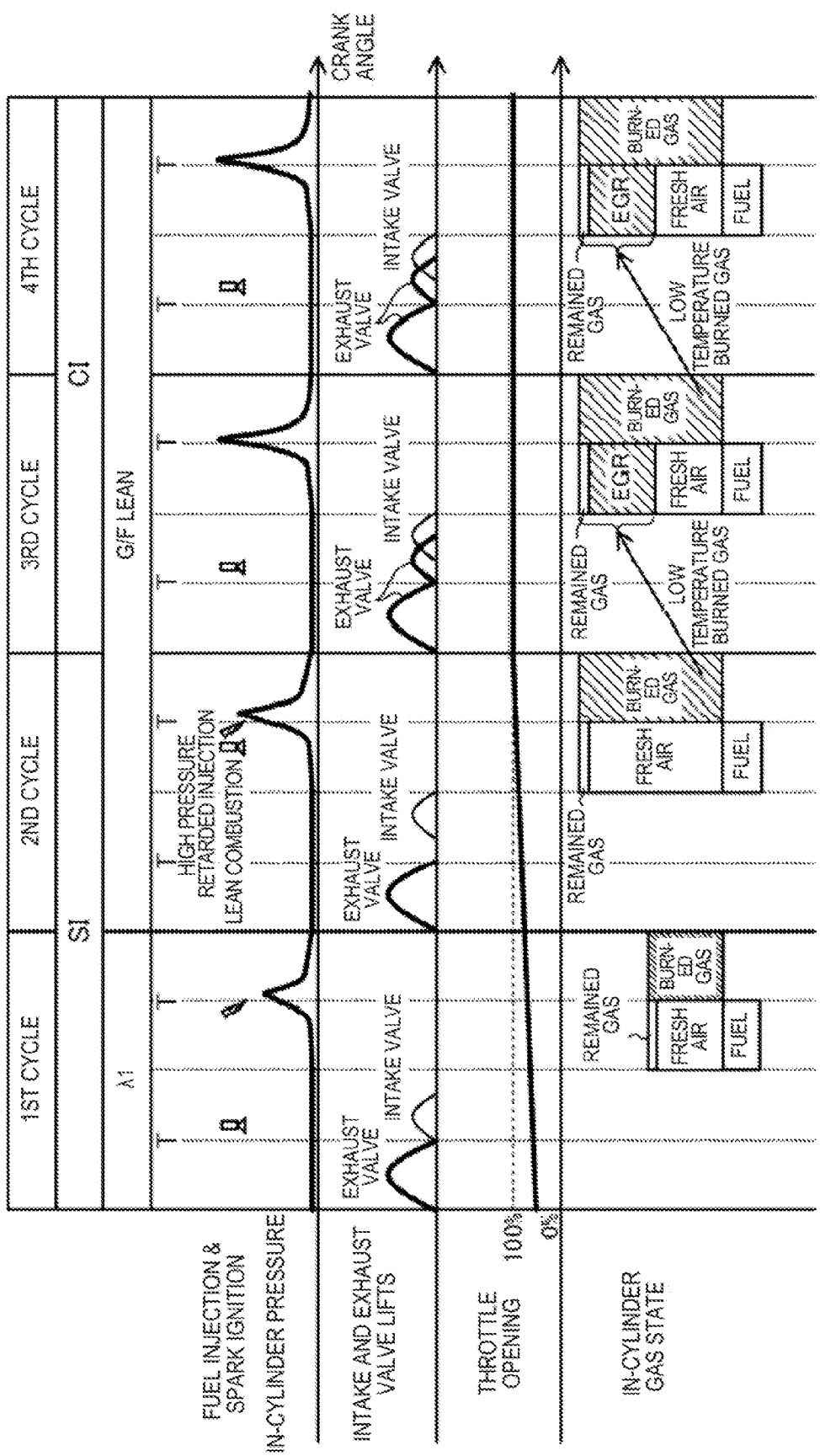
FIG. 8 is a time chart illustrating a control relating to a combustion temperature in switching from the SI mode to the CI mode.

FIG. 8 shows one example of a control for avoiding the pre-ignition immediately after switching the combustion mode by performing the transient combustion mode for leaning the air-fuel ratio A/F to decrease the temperature of the burned gas from the spark-ignition combustion immediately before switching from the SI mode to the CI mode.

FIG. 8, similarly to FIG. 7, shows one example of changes of the fuel injection timing and the spark-ignition timing, the change of the in-cylinder pressure, the change of the open state of the intake and exhaust valves, the change of the opening of the throttle valve, and the change of the in-cylinder gas state, in switching from the SI mode to the CI mode. Also in FIG. 8, for clarity, the SI mode is switched to the CI mode while the load of the engine 1 is stable, and in the SI mode, the EGR gas is not introduced and the opening of the throttle valve 36 is adjusted.

A first cycle in FIG. 8 which is the leftmost part therein is the same as the first cycle in FIG. 7. That is, the engine is operated in the SI mode, and here, the fuel injection is performed in the intake stroke period and the spark ignition is performed near the CTDC. The air-fuel ratio of the gas mixture is set to the theoretical air-fuel ratio ($\lambda \approx 1$) and the throttle valve is throttled to obtain the fresh air amount suitable for the fuel injection amount. Moreover, in the first cycle corresponding to the SI mode, the VVL 71 of the exhaust valve 22 is turned off (i.e., the internal EGR gas is not introduced).

The following second cycle corresponds to the cycle immediately before switching from the SI mode to the CI mode. Here, the throttle valve is opened to the full opening direction to increase the gas amount (fresh air amount) inside the cylinder 18. Thus, regarding the gas mixture inside the cylinder 18, the air-fuel ratio A/F becomes lean and the ratio between the working gas and the fuel (G/F) becomes lean simultaneously (also see the in-cylinder gas state shown in the lowest row of FIG. 8). The fuel injection is the high pressure retarded injection described above, in which the fuel injection and the spark ignition are performed near the CTDC. Thus, since the gas amount with respect to the fuel amount increases by setting A/F (and G/F) lean, the temperature of the burned gas from the spark-ignition combustion decreases. Increasing the introduction amount of fresh air having a comparatively low temperature is effective in decreasing the temperature inside the cylinder 18 to decrease the burned gas temperature. The second cycle corresponds to the transient combustion mode.

A third cycle corresponds to the cycle immediately after switching from the SI mode to the CI mode, where the exhaust open-twice control is performed by turning the VVL 71 on. Thereby, a part of the exhaust gas produced by the spark-ignition combustion in the second cycle is introduced into the cylinder 18, and the ratio between the working gas and the fuel (G/F) becomes lean. Note that, the air-fuel ratio (A/F) is the theoretical air-fuel ratio ($\lambda \approx 1$). In the third cycle, the internal EGR gas is introduced into the cylinder 18; however, as described above, since the exhaust gas temperature in the second cycle is suppressed comparatively low, the temperature inside the cylinder 18 becomes comparatively low.

Thus, in the third cycle, the pre-ignition is avoided even if the fuel injection is performed in the intake stroke period as set for the CI mode, and the lean gas mixture is compressed to ignite and combusts near the CTDC. The fourth cycle is the same as the third cycle.

Note that, in the example in FIG. 8, in the transient combustion mode, by performing the spark-ignition combustion in which the air-fuel ratio A/F is set lean, the rate of purifying NOx by the three-way catalyst may be reduced, and an NOx catalyst (e.g., LNT) may be provided as needed.

Moreover, in the transient combustion mode corresponding to the second cycle of the control example in FIG. 8, by scavenging the high-temperature remained gas inside the cylinder 18 (see the in-cylinder gas state shown in the lowest row in FIG. 8), the in-cylinder temperature may be decreased and the fresh air amount introduced into the cylinder 18 may be increased by the scavenging amount of the remained gas. For the scavenging in the cylinder 18, a dynamic pressure scavenging system for producing a negative pressure inside the exhaust port by an ejector effect caused by a high exhaust gas flow rate may be adopted, for example. Alternatively, an exhaust system for actuating a negative pressure wave within the exhaust port by exhaust gas pulsations, a so called 4-2-1 type, may be adopted.

Additionally, in the transient combustion mode corresponding to the second cycle in FIG. 8, by introducing the EGR gas into the cylinder 18, the ratio between the working gas and the fuel (G/F) may be set lean. The EGR gas introduced in the transient combustion mode is preferably the cooled EGR gas cooled by passing the EGR cooler 52. Thus, it becomes advantageous in decreasing the temperature inside the cylinder 18 to decrease the burned gas temperature.

Note that, the transient combustion mode shown in FIG. 8 is not only applied while switching from the SI mode to the CI mode while the engine 1 is stable as shown in FIG. 8, but is also applied in switching from the SI mode to the CI mode due to the load of the engine 1 reducing from high to low. Moreover, it is also advantageous in switching from the SI mode to the CI mode due to the temperature of the engine 1 increasing from the cold-start state to the warmed-up state.

In the control example of FIG. 8, the transient combustion mode is only performed in one cycle; however, it may be performed in a plurality of cycles. Moreover, in the control example in FIG. 8, in the SI mode, the EGR gas is generally not introduced but it may be introduced.

Moreover, the control example in FIG. 8 may be combined with that in FIG. 7. In other words, in the third cycle in the control example in FIG. 8 (i.e., immediately after switching to the CI mode), the compression combustion initial mode using the high pressure retarded injection may be performed additionally. The combination of the transient combustion mode with the compression combustion initial mode may be advantageous in avoiding more surely the increase of the combustion noises.

(Transient Combustion Mode for Reducing EGR Ratio Immediately after Switching Combustion Mode)

Figure 9:
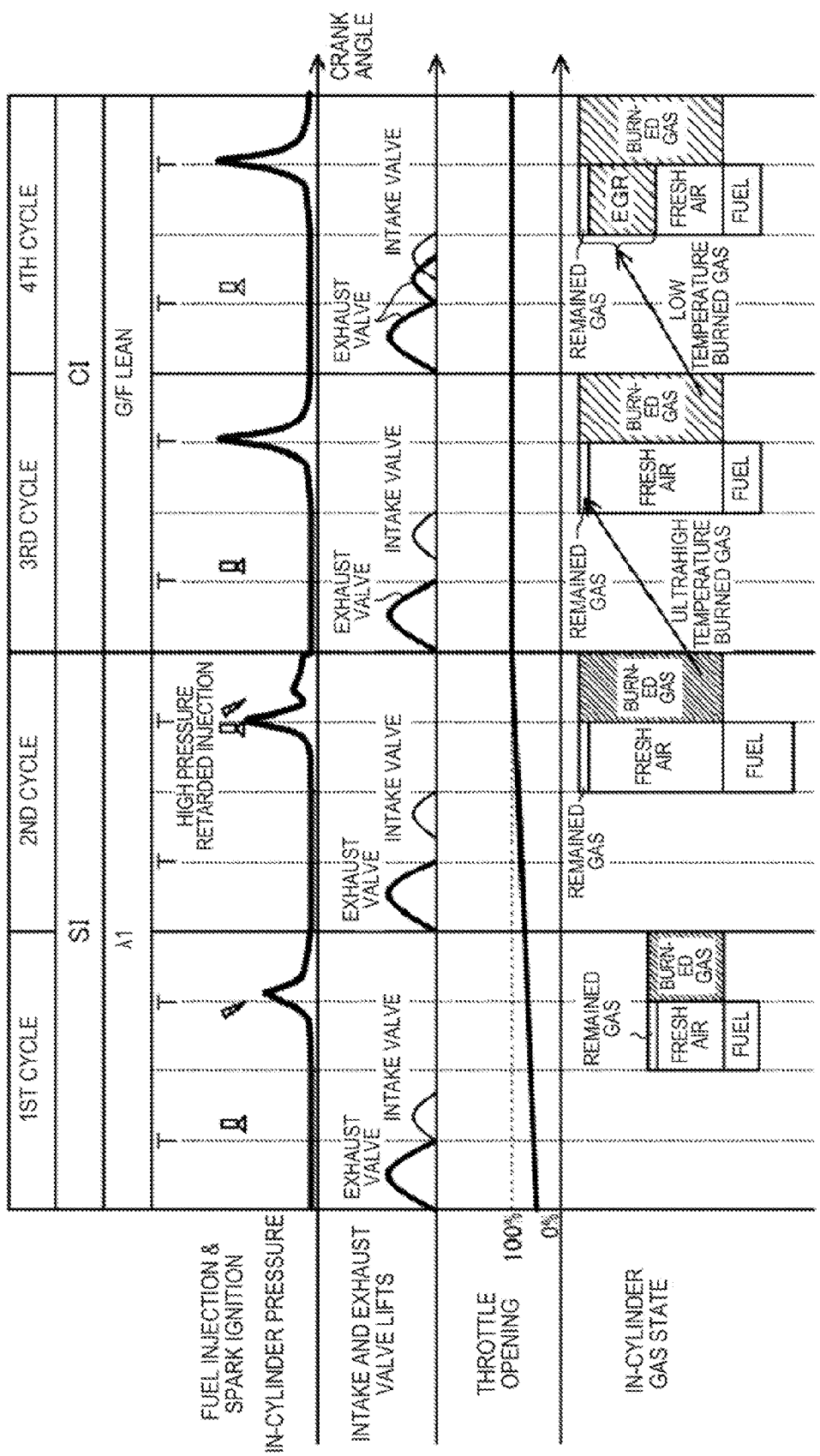
FIG. 9 is a time chart illustrating a control relating to an EGR ratio in switching from the SI mode to the CI mode.

FIG. 9 shows one example of a control of performing the transient combustion mode for temporarily reducing the EGR ratio immediately after switching from the SI mode to the CI mode, so that the temperature inside the cylinder 18 immediately after switching the combustion mode is deceased and the pre-ignition is avoided.

Specifically, similarly to FIG. 7, FIG. 9 shows one example of changes of the fuel injection timing and the spark-ignition timing, the change of the in-cylinder pressure, the change of the open state of the intake and exhaust valves, the change of the opening of the throttle valve, and the change of the in-cylinder gas state, in switching from the SI mode to the CI mode. Also in FIG. 9, for clarity, the SI mode is switched to the CI mode while the load of the engine 1 is stable, and in the SI mode, the EGR gas is not introduced and the opening of the throttle valve 36 is adjusted.

A first cycle corresponding to the leftmost part in FIG. 9 is the same as the first cycle in FIG. 7. Specifically, the engine is operated in the SI mode, and here, the fuel injection is performed in the intake stroke period, and the spark ignition is performed near the CTDC. The air-fuel ratio of the gas mixture is set to the theoretical air-fuel ratio ($\lambda \approx 1$) and the throttle valve is throttled to obtain the fresh air amount suitable for the fuel injection amount. Additionally, in the first cycle corresponding to the SI mode, the VVL 71 of the exhaust valve 22 is off (i.e., the internal EGR gas is not introduced).

The following second cycle corresponds to the cycle immediately before switching from the SI mode to the CI mode. This cycle is also the same as the second cycle in FIG. 7. Specifically, the throttle valve is opened to the full opening direction to increase the gas amount (fresh air amount) inside the cylinder 18. The fuel amount suitable for the increased fresh air amount is injected to keep the theoretical air-fuel ratio. This fuel injection is the high pressure retarded injection described above, in which the spark ignition is performed after the CTDC. By retarding the ignition timing as above, the stable engine load (stable torque) is maintained. Note that, by retarding the combustion period, the temperature of the exhaust gas (burned gas) increases. Moreover, the open timing of the intake valve 21 is retarded later than the first cycle.

A third cycle corresponds to the cycle immediately after switching from the SI mode to the CI mode, where the transient combustion mode is applied. Specifically, in the transient combustion mode, regardless of the combustion mode being switched to the CI mode where the VVL 71 is turned on, the VVL 71 is kept off and the exhaust open-twice control is not performed. Thus, the combustion mode switching becomes smooth and the high-temperature burned gas produced by the spark-ignition combustion in the second cycle is not introduced into the cylinder 18. As a result, the temperature inside the cylinder 18 becomes comparatively low. Note that, the VVL 71 may be turned on so that the internal EGR gas amount is reduced to be less than the internal EGR gas amount set for the CI mode.

In the third cycle, although the fuel injection is performed in the intake stroke period as set for the CI mode, since the temperature inside the cylinder 18 is comparatively low, the pre-ignition is avoided and the lean gas mixture is compressed to ignite and combusts near the CTDC. Since the burned gas temperature in the second cycle increases as described above, the temperature of the remained gas inside the cylinder 18 in the third cycle increases, and as a result, even though the exhaust open-twice control is not performed, the temperature inside the cylinder 18 becoming excessive low can avoided. Therefore, the lean gas mixture can surely be compressed to ignite near the CTDC and can combusts stably. Note that, in the third cycle, since the combustion is the compression-ignition combustion and the ratio between the working gas and the fuel (G/F) is lean, the burned gas temperature becomes low.

The fourth cycle corresponds to after the transient combustion mode ends, which is the same as the fourth cycle in FIG. 7. Specifically, as it is set in the normal CI mode, the VVL 71 is turned on and a part of the burned gas produced by the compression-ignition combustion in the third cycle is introduced into the cylinder 18; however, since the burned gas has the comparatively low temperature, the temperature inside the cylinder 18 becomes low. Thus, even though the fuel injection timing is set to during the intake stroke period, the pre-ignition is avoided. The lean gas mixture is compressed to ignite near the CTDC.

Note that, the transient combustion mode shown in FIG. 8 is not only applied in switching from the SI mode to the CI mode while the engine 1 is stable as shown in FIG. 8, but is also applied in switching from the SI mode to the CI mode due to the load of the engine 1 reducing from high to low. Moreover, it is also advantageous in switching from the SI mode to the CI mode due to the temperature of the engine 1 increasing from the cold-start state to the warmed-up state.

Further, in the control example of FIG. 9, the transient combustion mode is only performed in one cycle; however, it may be performed in a plurality of cycles. Moreover, in the control example in FIG. 9, in the SI mode, the opening of the throttled valve 36 is generally adjusted without introducing the EGR gas but it may be introduced.

Moreover, the control example in FIG. 9 may be combined with that in FIG. 7. In other words, in the third cycle in the control example in FIG. 9 (i.e., immediately after switching to the CI mode), the compression combustion initial mode using the high pressure retarded injection may be performed along with the transient combustion mode. The combination of the transient combustion mode with the compression combustion initial mode may be advantageous in avoiding more surely the increase of the combustion noises.

Note that, the application of the art disclosed herein is not limited to the engine configuration described above. For example, the fuel injection in the intake stroke period may be performed into the intake port 16 by a port injector separately provided in the intake port 16, instead of the injector 67 provided in the cylinder 18.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Further, in the description above, the air-fuel ratio of the gas mixture for the predetermined operating range is set to the theoretical air-fuel ratio ($\lambda \approx 1$); however, the air-fuel ratio of the gas mixture may be set lean. Note that, the setting of the air-fuel ratio to the theoretical air-fuel ratio has an advantage that a three-way catalyst can be used.

The operating ranges shown in FIG. 4 are merely an example, and other various operating ranges may be provided.

Moreover, the high pressure retarded injection may be split injections as needed. Similarly, the intake stroke injection may also be split injections as needed. With these split injections, the fuel may be injected on the intake stroke and the compression stroke.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine (Engine Body)
10 PCM (Controller)
18 Cylinder
25 Ignition Plug
50 EGR Passage (Exhaust Recirculator)
51 Main Passage (Exhaust Recirculator)
511 EGR Valve (Exhaust Recirculator)
52 EGR Cooler (Exhaust Recirculator)
53 EGR Cooler Bypass Passage (Exhaust Recirculator)
531 EGR Cooler Bypass Valve (Exhaust Recirculator)
62 Fuel Supply System (Fuel Pressure Setting Mechanism)
67 Injector (Fuel Injection Valve)
71 VVL (Exhaust Recirculator)

The invention claimed is:
1. A spark-ignition direct injection engine, comprising:
an engine body having a cylinder;
a fuel injection valve for injecting fuel into the cylinder to form a gas mixture therein;
a fuel pressure setting mechanism for setting a pressure of the fuel to be injected by the fuel injection valve;
an ignition plug arranged to be oriented toward inside the cylinder and for igniting the gas mixture within the cylinder; and
a controller for operating the engine body by controlling at least the fuel injection valve, the fuel pressure setting mechanism, and the ignition plug,
wherein the controller switches a combustion mode between a regular compression-ignition mode cycle, with a single, undivided first fuel injection within the regular compression-ignition mode cycle timed at a first fuel injection timing within a predetermined first load range, in which the engine body is operated to perform compression-ignition combustion where the gas mixture within the cylinder self-ignites to combust, and a spark-ignition mode cycle, with a single, undivided second fuel injection within the spark-ignition mode cycle timed at a second fuel injection timing within a predetermined second load range that is other than the first load range, in which the engine body is operated to perform spark-ignition combustion where the ignition plug is controlled to ignite the gas mixture within the cylinder to combust,
wherein within the first load range, the controller controls the fuel injection valve to perform the single, undivided first fuel injection within the regular compression-ignition mode cycle at the first fuel injection timing,
wherein within the second load range, the controller controls the fuel injection valve to perform the single, undivided second fuel injection within the spark-ignition mode cycle at the second fuel injection timing,
wherein during at least one or a plurality of predetermined compression-ignition transitional cycles immediately following the spark-ignition mode cycle and immediately preceding the regular compression-ignition mode cycle, the controller operates the engine body in a compression-ignition initial mode in which fuel pressure is set to be a high fuel pressure of 30 MPa or above by using the fuel pressure setting mechanism and the fuel injection valve is controlled to perform, within the first load range, a single, undivided retarded fuel injection within each predetermined compression-ignition transitional cycle with a retarded fuel injection timing that is retarded later than the first fuel injection timing, so that the retarded fuel injection timing is at least in a period from a late stage of compression stroke to an early stage of expansion stroke so that the gas mixture within the cylinder self-ignites to combust, and after the at least one or a plurality of predetermined compression-ignition transitional cycles ends, the controller controls the engine body to resume performing a fuel injection at the first injection timing within the regular compression-ignition mode cycle, and
wherein crank angles of the compression stroke are evenly divided in thirds into an early stage, a middle stage, and the late stage, and crank angles of the expansion stroke are evenly divided in thirds into the early stage, a middle stage, and a late stage.

2. The engine of claim 1, further comprising an exhaust recirculator for introducing exhaust gas into the cylinder,
wherein the controller causes the exhaust recirculator to introduce the exhaust gas into the cylinder in the regular compression-ignition mode cycle to increase an exhaust gas amount within the cylinder, and
wherein the controller, during the at least one or a plurality of predetermined compression-ignition transitional cycles in the compression-ignition initial mode, causes the exhaust recirculator to reduce the exhaust gas amount remaining within the cylinder.

3. The engine of claim 1, wherein the controller advances the fuel injection timing after the compression-ignition initial mode ends.

4. The engine of claim 1, wherein the controller operates the engine body in the regular compression-ignition mode cycle when an operating state of the engine body is within a predetermined low engine load range, and the controller operates the engine body in the spark-ignition mode cycle when the operating state of the engine body is within a higher engine load range than the predetermined low engine load range, and
wherein the controller operates the engine body in the compression-ignition initial mode immediately after the engine load decreases and the operating state of the engine body is shifted from the higher engine load range to the low engine load range.

5. The engine of claim 4, wherein within a specific low engine load part of the low engine load range where the engine body is operated in the regular compression-ignition mode cycle, the controller controls the fuel injection valve to perform the fuel injection at least in a period from intake stroke to a middle stage of the compression stroke, and
wherein the controller operates the engine body in the compression-ignition initial mode immediately after the engine load decreases and the operating state of the engine body is shifted from the higher engine load range to the low engine load range, and the controller advances the fuel injection timing to at least in the period from the intake stroke to the middle stage of the compression stroke immediately after the compression-ignition initial mode ends.

6. The engine of claim 5, wherein the controller controls the fuel pressure setting mechanism to set the fuel pressure to a low fuel pressure of below 30 MPa when the fuel injection timing is advanced to at least in the period from the intake stroke to the middle stage of the compression stroke immediately after the compression-ignition initial mode ends.

7. The engine of claim 1, wherein the controller operates the engine body in the regular compression-ignition mode cycle when a temperature of the engine body is in a warmed-up state that is higher than a predetermined temperature, and the controller operates the engine body in the spark-ignition mode cycle when the temperature of the engine body is in a cold-start state that is lower than the predetermined temperature, and
wherein the controller operates the engine body in the compression-ignition initial mode immediately after the temperature of the engine body increases and the mode is switched from the spark-ignition mode cycle to the regular compression-ignition mode cycle.

8. The engine of claim 7, wherein when the temperature of the engine body is in the cold-start state that is lower than the predetermined temperature, the controller controls the fuel pressure setting mechanism to set the fuel pressure to a low fuel pressure of below 30 MPa, controls the fuel injection valve to perform the fuel injection at least in the period from the intake stoke to the middle stage of the compression stroke, and operates the engine body in the spark-ignition mode cycle.

9. A spark-ignition direct injection engine, comprising:
an engine body having a cylinder;
a fuel injection valve for injecting fuel into the cylinder to form gas mixture therein;
a fuel pressure setting mechanism for setting a pressure of the fuel to be injected by the fuel injection valve;
an ignition plug arranged to be oriented toward inside the cylinder and for igniting gas mixture within the cylinder; and
a controller for operating the engine body by controlling at least the fuel injection valve, the fuel pressure setting mechanism, and the ignition plug,
wherein the controller operates, within a predetermined first load range, the engine body in a regular compression-ignition mode cycle to perform compression-ignition combustion where the gas mixture within the cylinder self-ignites to combust, and the controller operates, within a second load range that is other than the first load range, the engine body in a spark-ignition mode cycle to perform spark-ignition combustion where the ignition plug is controlled to ignite the gas mixture within the cylinder to combust,
wherein within a specific part of the first load range where the engine load is high therein, the controller controls the fuel pressure setting mechanism to set the fuel pressure to be a high fuel pressure of 30 MPa or above and controls the fuel injection valve to perform a single, undivided fuel injection at a specific part injection timing at least in a retard period from a late stage of compression stroke to an early stage of expansion stroke so that the gas mixture within the cylinder self-ignites to combust,
wherein within the second load range, the controller controls the fuel injection valve to perform a single, undivided second fuel injection within the spark-ignition mode cycle at a second fuel injection timing so that the gas mixture within the cylinder ignites to combust, and
wherein during at least one or a plurality of predetermined compression-ignition transitional cycles immediately after the operating state of the engine body is shifted from the second load range to the specific part of the first load range and immediately preceding the regular compression-ignition mode cycle, the controller operates the engine body in a compression-ignition initial mode within the specific part of the first operating range and controls the fuel injection valve to perform a single, undivided retarded fuel injection within each predetermined compression-ignition transitional cycle with a retarded fuel injection timing that is retarded later than the specific part injection timing, and after the at least one or a plurality of predetermined compression-ignition transitional cycles ends, the controller controls the engine body to resume performing a fuel injection at the specific part injection timing within the specific part in the regular compression-ignition mode cycle, and
wherein crank angles of the compression stroke are evenly divided in thirds into an early stage, a middle stage, and the late stage, and crank angles of the expansion stroke are evenly divided in thirds into the early stage, a middle stage, and a late stage.

10. The engine of claim 9, where the first load range is a low engine load range where the engine load is below a predetermined load, and the second load range is a high engine load range where the engine load is above the predetermined load.

11. The engine of claim 10, wherein within a low engine load part of the first load range, the controller controls the fuel pressure setting mechanism to set the fuel pressure to a low fuel pressure of below 30 MPa and control the fuel injection valve to perform the single, undivided fuel injection at least in a period from intake stoke to a middle stage of compression stroke.

12. A spark-ignition direct injection engine, comprising:
an engine body having a cylinder;
a fuel injection valve for injecting fuel into the cylinder to form a gas mixture therein;
a fuel pressure setting mechanism for setting a pressure of the fuel to be injected by the fuel injection valve;
an ignition plug arranged to be oriented toward inside the cylinder and for igniting the gas mixture within the cylinder; and
a controller for operating the engine body by controlling at least the fuel injection valve, the fuel pressure setting mechanism, and the ignition plug,
wherein the controller switches a combustion mode between a regular compression-ignition mode cycle, with a single, undivided first fuel injection within the regular compression-ignition mode cycle timed at a first fuel injection timing within a predetermined first load range, in which the engine body is operated to perform compression-ignition combustion where the gas mixture within the cylinder self-ignites to combust, and a spark-ignition mode cycle, with a single, undivided second fuel injection within the spark-ignition mode cycle timed at a second fuel injection timing within a predetermined second load range that is other than the first load range, in which the engine body is operated to perform spark-ignition combustion where the ignition plug is controlled to ignite the gas mixture within the cylinder to combust,
wherein within the first load range, the controller controls the fuel injection valve to perform the single, undivided first fuel injection within the regular compression-ignition mode cycle at the first fuel injection timing,
wherein within the second load range, the controller controls the fuel injection valve to perform the single, undivided second fuel injection within the spark-ignition mode cycle at the second fuel injection timing,
wherein during a first compression-ignition transitional cycle immediately following the spark-ignition mode cycle and immediately preceding the regular compression-ignition mode cycle, the controller operates the engine body in a compression-ignition initial mode in which fuel pressure is set to be a high fuel pressure of 30 MPa or above by using the fuel pressure setting mechanism and the fuel injection valve is controlled to perform, within the first load range, a single, undivided retarded fuel injection within each predetermined compression-ignition transitional cycle with a retarded fuel injection timing that is retarded later than the first fuel injection timing, so that the retarded fuel injection timing is at least in a period from a late stage of compression stroke to an early stage of expansion stroke so that the gas mixture within the cylinder self-ignites to combust, and after the first compression-ignition transitional cycle ends, the controller controls the engine body to resume performing a fuel injection at the first injection timing within the regular compression-ignition mode cycle, and
wherein crank angles of the compression stroke are evenly divided in thirds into an early stage, a middle stage, and the late stage, and crank angles of the expansion stroke are evenly divided in thirds into the early stage, a middle stage, and a late stage.

13. The engine of claim 12, wherein during the first compression-ignition transitional cycle immediately following the spark-ignition mode cycle and immediately preceding the regular compression-ignition mode cycle, the controller operates the engine body in the compression-ignition initial mode in a predetermined transitional load range that is a higher engine load range than the first load range,
wherein during the spark-ignition mode cycle, the controller operates the engine body in the second load range that is a higher engine load range than the transitional load range,
wherein within a specific part of the first load range where the engine load is high therein, the controller controls the fuel pressure setting mechanism to set the fuel pressure to be a high fuel pressure of 30 MPa or above and controls the fuel injection valve to perform a single, undivided fuel injection within the regular compression-ignition mode cycle at a specific part injection timing at least in a retard period from a late stage of compression stroke to an early stage of expansion stroke so that the gas mixture within the cylinder self-ignites to combust, and
wherein during a second compression-ignition transitional cycle immediately after the operating state of the engine body is shifted from the second load range to the specific part of the first load range and immediately preceding the regular compression-ignition mode cycle, the controller operates the engine body in the compression-ignition initial mode and controls the fuel injection valve to perform, within the specific part of the first load range, a single, undivided retarded fuel injection with a retarded fuel injection timing that is retarded later than the specific part injection timing, and after the second compression-ignition transitional cycle ends, the controller controls the engine body to resume performing a fuel injection at the specific part injection timing within the specific part in the regular compression-ignition mode cycle.

14. The engine of claim 1, wherein the compression-ignition initial mode comprises one predetermined compression-ignition transitional cycle immediately following the spark-ignition mode cycle and immediately preceding the regular compression-ignition mode cycle.

* * * * *